United States Patent
Peck et al.

(10) Patent No.: US 12,271,658 B2
(45) Date of Patent: Apr. 8, 2025

(54) DIGITAL ASSISTANT INTERACTIONS IN COPRESENCE SESSIONS

(71) Applicants: Apple Inc., Cupertino, CA (US); DATHOMIR LABORATORIES LLC, Boston, MA (US)

(72) Inventors: Jessica J. Peck, Morgan Hill, CA (US); James N. Jones, San Francisco, CA (US); Ieyuki Kawashima, Pleasanton, CA (US); Lynn I. Streja, San Francisco, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/278,369

(22) PCT Filed: Feb. 23, 2022

(86) PCT No.: PCT/US2022/017500
§ 371 (c)(1),
(2) Date: Aug. 22, 2023

(87) PCT Pub. No.: WO2022/182744
PCT Pub. Date: Sep. 1, 2022

(65) Prior Publication Data
US 2024/0319959 A1    Sep. 26, 2024

Related U.S. Application Data

(60) Provisional application No. 63/152,719, filed on Feb. 23, 2021.

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/012* (2013.01); *G06F 3/013* (2013.01); *G06F 9/453* (2018.02); *G06V 20/20* (2022.01)

(58) Field of Classification Search
CPC .......... G06F 3/167; G06F 9/453; G06F 3/012; G06F 3/013; G06F 3/017; G06V 20/20;
(Continued)

(56) References Cited

U.S. PATENT DOCUMENTS 9,210,413 B2   12/2015  Grinberg et al.
9,250,703 B2   2/2016   Hernandez-Abrego et al.
(Continued)

FOREIGN PATENT DOCUMENTS

AU    2018100187 A4    3/2018
CN    105320726 A      2/2016
(Continued)

OTHER PUBLICATIONS

Carbune et al., "Adapting Delivery of Virtual Assistant Responses that Include Private Information", Technical Disclosure Commons, Defensive Publications Series, Article No. 3516, Online available at: https://www.tdcommons.org/cgi/viewcontent.cgi?article=4593&context=dpubs_series, Aug. 11, 2020, 8 pages.
(Continued)

*Primary Examiner* — Richard J Hong
(74) *Attorney, Agent, or Firm* — DLA Piper LLP (US)

(57) ABSTRACT

An example process includes: displaying, on a display of an electronic device, an extended reality (XR) environment corresponding to a copresence session including the electronic device and a second electronic device; while displaying the XR environment: sampling, with a microphone of the electronic device, a first audio input; determining whether the first audio input is intended for a first digital assistant operating on an external electronic device; and in accor-
(Continued)

dance with a determination that the first audio input is intended for the first digital assistant: causing the first digital assistant to provide an audible response to the first audio input, where the audible response is not transmitted to the second electronic device over a shared communication channel for the copresence session.

70 Claims, 8 Drawing Sheets

(51) Int. Cl.
*G06F 9/451* (2018.01)
*G06V 20/20* (2022.01)

(58) Field of Classification Search
CPC ... G10L 15/08; G10L 15/1815; G06T 19/006; G06T 1/20; G06T 19/00; H04L 67/025; H04L 12/1818; H04M 3/53366
See application file for complete search history.

(56) References Cited

U.S. PATENT DOCUMENTS

| | | | |
|---|---|---|---|
| 9,865,091 B2 | 1/2018 | Giraldi et al. | |
| 10,089,072 B2 | 10/2018 | Piersol et al. | |
| 10,135,965 B2 | 11/2018 | Woolsey et al. | |
| 10,242,501 B1 | 3/2019 | Pusch et al. | |
| 10,416,760 B2 | 9/2019 | Burns et al. | |
| 10,445,523 B2 | 10/2019 | Clement et al. | |
| 10,725,629 B2 | 7/2020 | Badr et al. | |
| 10,847,142 B2 | 11/2020 | Newendorp et al. | |
| 10,942,702 B2 | 3/2021 | Piersol et al. | |
| 11,038,934 B1 | 6/2021 | Hansen et al. | |
| 11,043,220 B1 | 6/2021 | Hansen et al. | |
| 11,133,008 B2 | 9/2021 | Piernot et al. | |
| 11,183,193 B1 | 11/2021 | Hansen et al. | |
| 2012/0249741 A1 | 10/2012 | Maciocci et al. | |
| 2013/0304479 A1 | 11/2013 | Teller et al. | |
| 2014/0310595 A1 | 10/2014 | Acharya et al. | |
| 2015/0019219 A1 | 1/2015 | Tzirkel-hancock et al. | |
| 2015/0088514 A1 | 3/2015 | Typrin | |
| 2015/0235434 A1* | 8/2015 | Miller | G06T 1/20 345/633 |
| 2015/0348548 A1 | 12/2015 | Piernot et al. | |
| 2015/0373183 A1 | 12/2015 | Woolsey et al. | |
| 2016/0091967 A1 | 3/2016 | Prokofieva et al. | |
| 2016/0132290 A1 | 5/2016 | Raux | |
| 2016/0155443 A1 | 6/2016 | Khan et al. | |
| 2017/0076720 A1 | 3/2017 | Gopalan et al. | |
| 2017/0083285 A1 | 3/2017 | Meyers et al. | |
| 2017/0235361 A1 | 8/2017 | Rigazio et al. | |
| 2017/0287215 A1 | 10/2017 | Lalonde et al. | |
| 2017/0326457 A1 | 11/2017 | Tilton et al. | |
| 2017/0357478 A1 | 12/2017 | Piersol et al. | |
| 2018/0007210 A1* | 1/2018 | Todasco | H04M 3/53366 |
| 2018/0108351 A1 | 4/2018 | Beckhardt et al. | |
| 2018/0157398 A1 | 6/2018 | Kaehler et al. | |
| 2018/0225131 A1 | 8/2018 | Tommy et al. | |
| 2018/0233147 A1* | 8/2018 | Tukka | G10L 15/1815 |
| 2018/0352070 A1 | 12/2018 | Eichfeld | |
| 2019/0012141 A1 | 1/2019 | Piersol et al. | |
| 2019/0096134 A1 | 3/2019 | Amacker et al. | |
| 2019/0187787 A1 | 6/2019 | White et al. | |
| 2019/0221215 A1* | 7/2019 | Mixter | G10L 15/08 |
| 2019/0227694 A1* | 7/2019 | Shin | G06F 3/017 |
| 2019/0311720 A1 | 10/2019 | Pasko | |
| 2019/0332400 A1 | 10/2019 | Spoor et al. | |
| 2019/0384389 A1* | 12/2019 | Kim | G06F 3/017 |
| 2020/0098362 A1 | 3/2020 | Piernot et al. | |
| 2020/0125377 A1 | 4/2020 | Van Scheltinga et al. | |
| 2020/0193997 A1 | 6/2020 | Piernot et al. | |
| 2021/0090567 A1* | 3/2021 | Tukka | H04L 67/025 |
| 2021/0216134 A1 | 7/2021 | Fukunaga et al. | |
| 2021/0249009 A1 | 8/2021 | Manjunath et al. | |
| 2021/0294569 A1 | 9/2021 | Piersol et al. | |
| 2021/0295602 A1 | 9/2021 | Scapel et al. | |
| 2021/0350799 A1 | 11/2021 | Hansen et al. | |
| 2021/0350803 A1 | 11/2021 | Hansen et al. | |
| 2021/0350810 A1 | 11/2021 | Phipps et al. | |
| 2021/0352115 A1 | 11/2021 | Hansen et al. | |
| 2021/0390955 A1 | 12/2021 | Piernot et al. | |
| 2022/0114327 A1 | 4/2022 | Faaborg et al. | |
| 2022/0155861 A1* | 5/2022 | Myung | G06T 19/006 |
| 2022/0198758 A1* | 6/2022 | Laaksonen | H04L 12/1818 |
| 2022/0215630 A1* | 7/2022 | Solanki | G06T 19/00 |
| 2022/0329691 A1 | 10/2022 | Chinthakunta et al. | |
| 2023/0058929 A1 | 2/2023 | Lasko et al. | |
| 2023/0179704 A1 | 6/2023 | Chinthakunta et al. | |
| 2024/0134492 A1 | 4/2024 | Peck et al. | |

FOREIGN PATENT DOCUMENTS

| | | |
|---|---|---|
| CN | 106465074 A | 2/2017 |
| CN | 112204507 A | 1/2021 |
| EP | 2940556 A1 | 11/2015 |
| WO | 2015/047932 A1 | 4/2015 |
| WO | 2016/085776 A1 | 6/2016 |
| WO | 2017/044629 A1 | 3/2017 |
| WO | 2017/053311 A1 | 3/2017 |
| WO | 2017/213678 A1 | 12/2017 |
| WO | 2018/090060 A1 | 5/2018 |
| WO | 2019/079826 A1 | 4/2019 |

OTHER PUBLICATIONS

International Preliminary Report on Patentability received for PCT Patent Application No. PCT/US2022/017343, mailed on Sep. 7, 2023, 11 pages.
International Search Report and Written Opinion received for PCT Patent Application No. PCT/US2022/017343, mailed on Jun. 13, 2022, 17 pages.
International Preliminary Report on Patentability received for PCT Patent Application No. PCT/US2022/017500, mailed on Sep. 7, 2023, 9 pages.
International Search Report and Written Opinion received for PCT Patent Application No. PCT/US2022/017500, mailed on Jun. 1, 2022, 12 pages.
Office Action received for European Patent Application No. 22713782. 5, mailed on Jul. 1, 2024, 9 pages.

\* cited by examiner

DIGITAL ASSISTANT INTERACTIONS IN COPRESENCE SESSIONS

CROSS REFERENCE TO RELATED APPLICATIONS

This application is a U.S. National Stage Patent Application of PCT Application No. PCT/US2022/017500, entitled "DIGITAL ASSISTANT INTERACTIONS IN COPRESENCE SESSIONS," filed on Feb. 23, 2022, which claims priority to U.S. Patent Application No. 63/152,719, entitled "DIGITAL ASSISTANT INTERACTIONS IN COPRESENCE SESSIONS," filed on Feb. 23, 2021. The contents of each of these applications are hereby incorporated by reference in their entireties.

FIELD

This relates generally to digital assistants and, more specifically, to digital assistant interactions in copresence sessions.

BACKGROUND

Digital assistants may allow users to interact with devices using natural language input in spoken or text form. For example, a user can provide a speech input including a user request to a digital assistant operating on an electronic device. The digital assistant can determine the user's intent from the speech input and determine a corresponding task. The digital assistant can perform the task by executing one or more services of the electronic device to provide an output responsive to the user request.

SUMMARY

Example methods are disclosed herein. An example method includes: displaying, on a display of an electronic device, an extended reality (XR) environment corresponding to a copresence session including the electronic device and a second electronic device; while displaying the XR environment: sampling, with a microphone of the electronic device, a first audio input; determining whether the first audio input is intended for a first digital assistant operating on an external electronic device; and in accordance with a determination that the first audio input is intended for the first digital assistant: causing the first digital assistant to provide an audible response to the first audio input, where the audible response is not transmitted to the second electronic device over a shared communication channel for the copresence session.

Example non-transitory computer-readable media are disclosed herein. An example non-transitory computer-readable storage medium stores one or more programs. The one or more programs comprise instructions, which when executed by one or more processors of an electronic device having a display and a microphone, cause the electronic device to: display, on the display, an extended reality (XR) environment corresponding to a copresence session including the electronic device and a second electronic device; while displaying the XR environment: sample, with the microphone, a first audio input; determine whether the first audio input is intended for a first digital assistant operating on an external electronic device; and in accordance with a determination that the first audio input is intended for the first digital assistant: cause the first digital assistant to provide an audible response to the first audio input, wherein the audible response is not transmitted to the second electronic device over a shared communication channel for the copresence session.

Example electronic devices are disclosed herein. An example electronic device comprises a display, a microphone, one or more processors; a memory; and one or more programs, where the one or more programs are stored in the memory and configured to be executed by the one or more processors, the one or more programs including instructions for: displaying, on the display, an extended reality (XR) environment corresponding to a copresence session including the electronic device and a second electronic device; while displaying the XR environment: sampling, with the microphone, a first audio input; determining whether the first audio input is intended for a first digital assistant operating on an external electronic device; and in accordance with a determination that the first audio input is intended for the first digital assistant: causing the first digital assistant to provide an audible response to the first audio input, where the audible response is not transmitted to the second electronic device over a shared communication channel for the copresence session.

An example electronic device comprises, means for: displaying, on a display of an electronic device, an extended reality (XR) environment corresponding to a copresence session including the electronic device and a second electronic device; while displaying the XR environment: sampling, with a microphone of the electronic device, a first audio input; determining whether the first audio input is intended for a first digital assistant operating on an external electronic device; and in accordance with a determination that the first audio input is intended for the first digital assistant: causing the first digital assistant to provide an audible response to the first audio input, where the audible response is not transmitted to the second electronic device over a shared communication channel for the copresence session.

Providing the audible response not transmitted to the second device according to the above-described techniques can allow devices to accurately initiate private digital assistant interactions during copresence sessions. For example, a determination that audio input is intended for the first digital assistant operating on the external device (e.g., based on detecting a user physically facing the external device while providing the audio input) can accurately indicate that the user intends to initiate a private digital assistant interaction. The device providing the copresence session can thus perform actions to provide the private interaction, e.g., preventing the user's request to the digital assistant and/or the digital assistant's response to the request from being transmitted to the other user(s). Additionally, the device can provide the private digital assistant interaction while displaying the XR environment, thereby reducing the digital assistant's disruption to the user's XR experience. In this manner, devices are made more accurate, efficient, and secure (e.g., by allowing devices to accurately determine when to initiate private digital assistant interactions, by reducing the number of user inputs required to initiate the private interactions, by not revealing a user's personal information to other user(s), by reducing the disruption of private digital assistant interactions to users' XR experiences, etc.), which, additionally, reduces power usage and improves battery life of the device.

DESCRIPTION

Figure 1A:
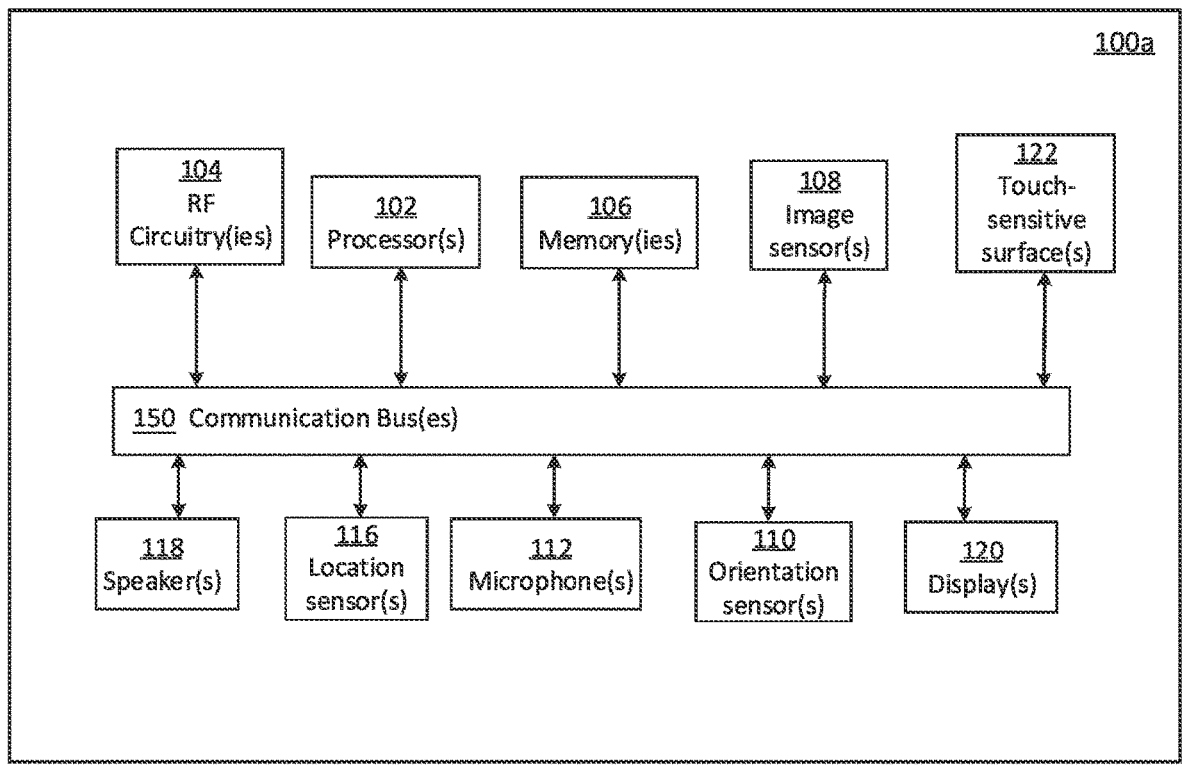
FIGS. 1A-1B depict exemplary systems for use in various extended reality technologies.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram FIG. 1A and FIG. 1B depict exemplary system 100 for use in various extended reality technologies.

As shown in FIG. 1A, system 100 includes device 100*a*. Device 100*a* includes RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100*a*.

In some examples, a base station device (e.g., a computing device, such as a remote server, mobile device, or laptop) implements some components of system 100 and a second device (e.g., a head-mounted device) implements other components of system 100. In some examples, device 100*a* is implemented in a base station device or in a second device.

Figure 1B:
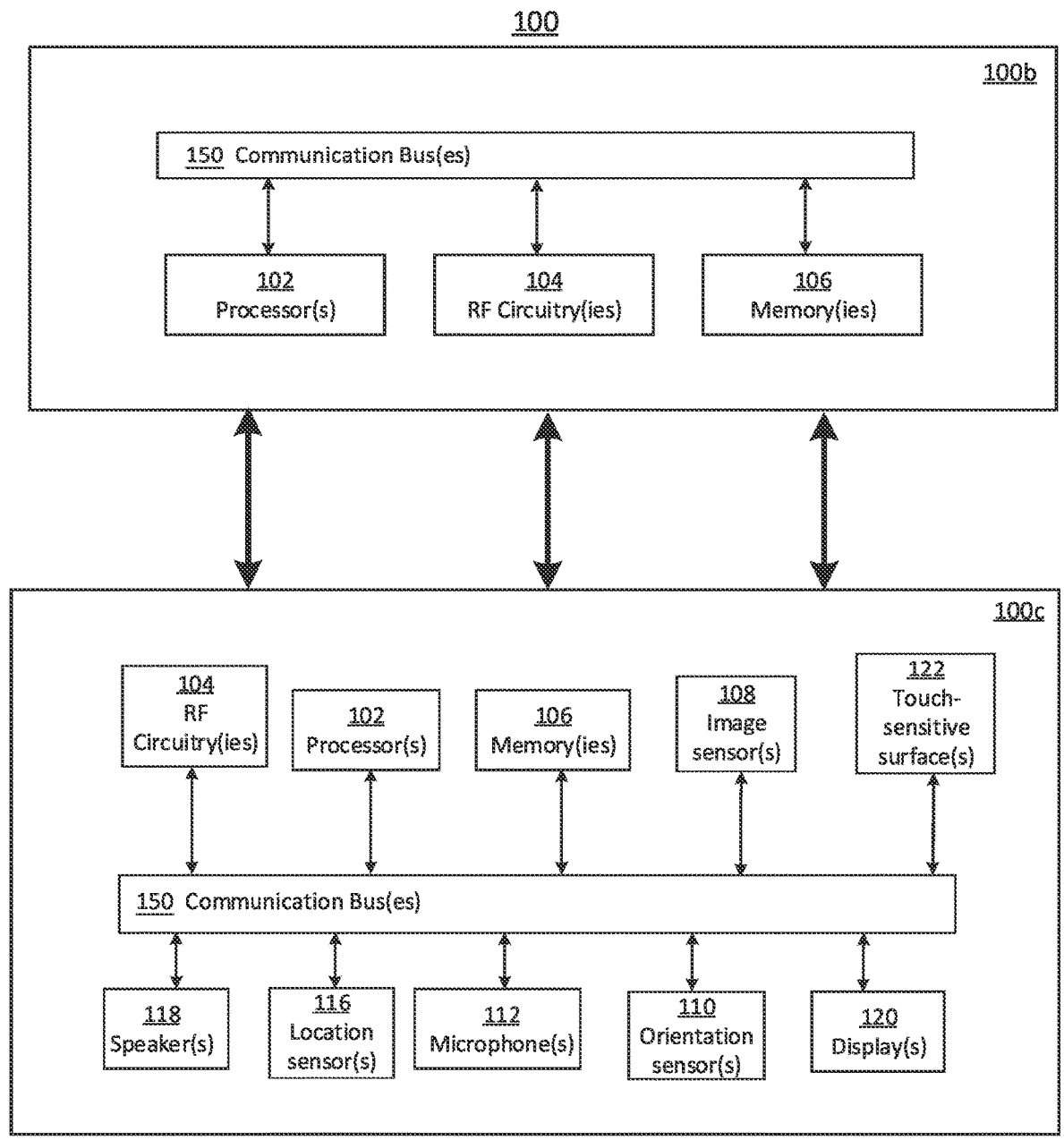

As shown in FIG. 1B, in some examples, system 100 includes two or more devices in communication, e.g., via a wired connection or a wireless connection. First device 100*b* (e.g., a base station device) includes memory(ies) 106, RF circuitry(ies) 104, and processor(s) 102. Such components optionally communicate using communication bus(es) 150 of device 100*b*. Second device 100*c* (e.g., a head-mounted device) includes components such as RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100*c*.

System 100 includes RF circuitry(ies) 104. RF circuitry(ies) 104 optionally include circuitry for communicating with networks (e.g., the Internet, a wireless network (e.g., such as cellular networks and wireless local area networks (LANs)), and/or intranets) and/or electronic devices. RF circuitry(ies) 104 optionally includes circuitry for communicating using near-field communication and/or short-range communication (e.g., Bluetooth®).

System 100 includes processor(s) 102 and memory(ies) 106. Processor(s) 102 include one or more graphics processors, one or more general processors, and/or one or more digital signal processors. In some examples, memory(ies) 106 are one or more non-transitory computer-readable storage mediums (e.g., random access memory, flash memory) storing computer-readable instructions configured to be executed by processor(s) 102 to perform the techniques described below System 100 includes image sensor(s) 108. Image sensors(s) 108 optionally include one or more infrared (IR) sensor(s), e.g., a passive IR sensor or an active IR sensor, to detect infrared light from the physical environment. For example, an active IR sensor includes an IR emitter (e.g., an IR dot emitter) for emitting infrared light into the physical environment. Image sensor(s) 108 also optionally include one or more visible light image sensors, such as complementary metal-oxide-semiconductor (CMOS) sensors and/or charged coupled device (CCD) sensors capable of obtaining images of physical elements from the physical environment. Image sensor(s) 108 also optionally include one or more event camera(s) configured to capture movement of physical elements in the physical environment. Image sensor(s) 108 also optionally include one or more depth sensor(s) capable of detecting the distance of physical elements from system 100. In some examples, system 100 uses IR sensors, CCD sensors, event cameras, and depth sensors together to detect the physical environment around system 100. In some examples, image sensor(s) 108 include first and second image sensors. The first and second image sensors are optionally capable of capturing images of physical elements in the physical environment from two respective different perspectives. In some examples, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed elements in the physical environment. In some examples, image sensor(s) 108 are capable of receiving user inputs, such as hand gestures.

In some examples, system 100 includes touch-sensitive surface(s) 122 for receiving user inputs, such as tapping or swiping inputs. In some examples, touch-sensitive surface(s) 122 and display(s) 120 are combined into touch-sensitive display(s).

In some examples, system 100 includes microphones(s) 112. System 100 uses microphone(s) 112 to detect sound from the user's physical environment or from the user. In some examples, microphone(s) 112 includes a microphone array (e.g., including a plurality of microphones) that optionally operate together, e.g., to locate the spatial source of sound from the physical environment or to identify ambient noise.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as relative to physical elements in the physical environment. Orientation sensor(s) 110 optionally include gyroscope(s) and/or accelerometer(s)

System 100 includes display(s) 120. Display(s) 120 may operate with a transparent or semi-transparent displays (and optionally with one or more imaging sensors). Display(s) 120 may include an opaque display. Display(s) 120 may allow a person to view a physical environment directly through the display, and may also allow addition of virtual content to the person's field of view, e.g., by superimposing virtual content over the physical environment. Display(s) 120 may implement display technologies such as a digital light projector, a laser scanning light source, LEDs, OLEDs, liquid crystal on silicon, or combinations thereof. Display(s) 120 can include substrates through which light is transmitted, e.g., optical reflectors and combiners, light waveguides, holographic substrates, or combinations thereof. As a particular example, the transparent or semi-transparent display may selectively transition between a transparent or semi-transparent state and an opaque state. Further example implementations of display(s) 120 include display-capable lenses, tablets, smartphones, desktop computers, laptop computers, heads up displays, display-capable automotive windshields, or display-capable windows. In some examples, system 100 is a projection-based system. For example, system 100 projects virtual objects onto a physical environment (e.g., projects a holograph onto a physical environment or projects imagery onto a physical surface). As another example, system 100 uses retinal projection to project images onto a person's eyes (e.g., retina). In some examples, system 100 can be configured to interface with an external display (e.g., a smartphone display).

Figure 2A:
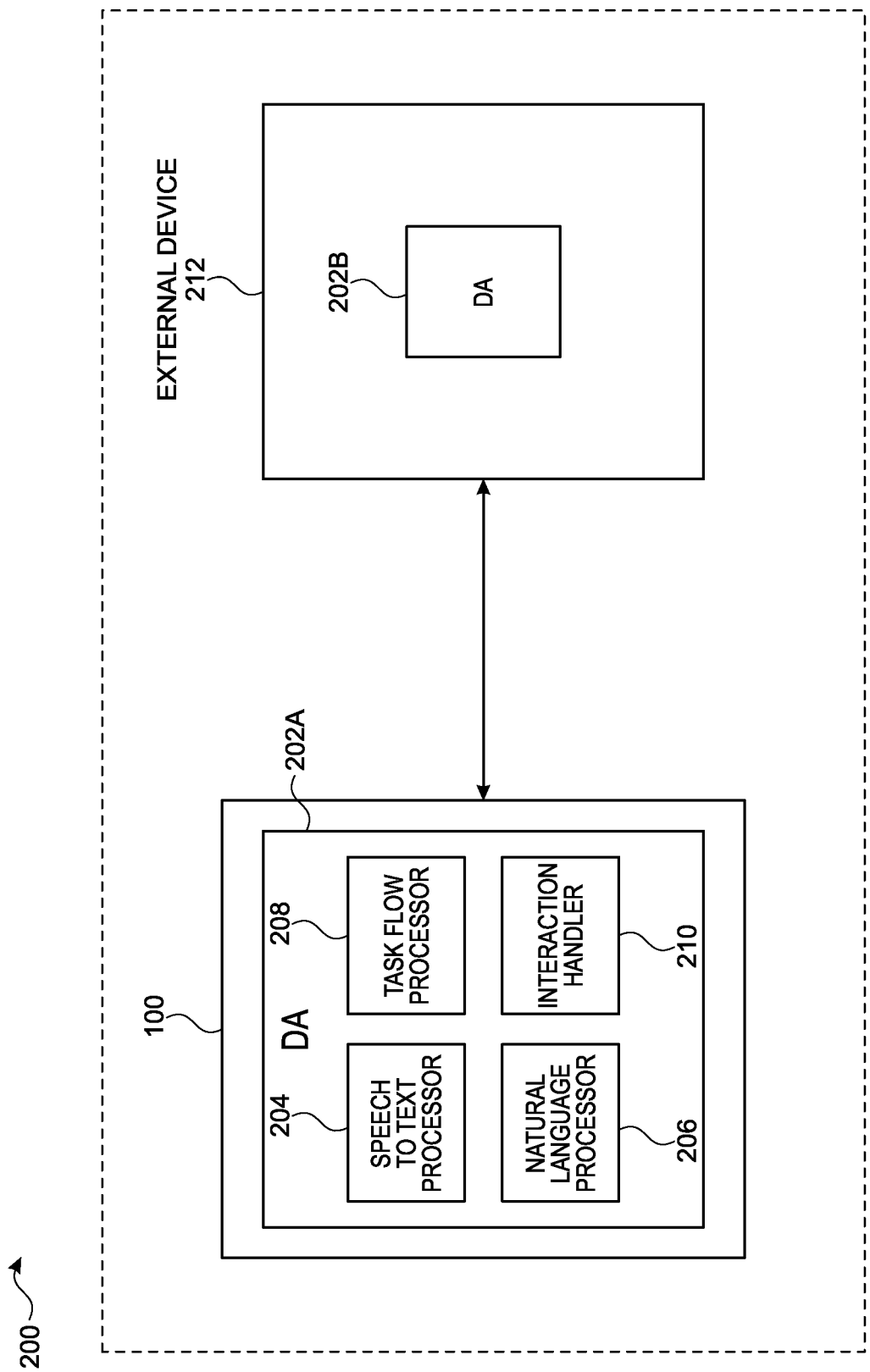
FIG. 2A illustrates a block diagram of a system for providing digital assistant interactions within a copresence session, according to various examples.

FIG. 2A illustrates a block diagram of system 200 for providing digital assistant (DA) interactions within a copresence session, according to various examples. A copresence session generally describes a multi-user computer-assisted communication session configured so each user simultaneously experiences a shared physical or virtual environment. For example, in a copresence session, each participant (e.g., represented by their respective avatars) may gather in a shared environment (e.g., a virtual house). Each participant may perceive (e.g., see and/or hear), with computer assistance, the shared environment and the other participants. It will be appreciated that system 100 can implement a copresence session for a user.

DAs can be used within copresence sessions to perform tasks requested by the participants. Some interactions between a participant and the DA can be public to the other participants, e.g., so the other participants can perceive the participant's request to the DA and the DA's response to the request. For example, a participant can request the DA change a characteristic of the shared virtual environment. The DA can change the environment as requested, with the change being visible to all participants. Sometimes, however, a participant desires to interact with the DA privately, e.g., so the other participants cannot perceive the participant's DA request and/or the DA's response. For example, when a participant requests the DA to read the participant's email messages, the participant might not want other participants to perceive the request and/or the DA's response (e.g., speech output of email messages). FIGS. 2A-2B, 3A-3E, 4, and 5 below discuss systems and techniques for providing public and private DA interactions within a copresence session.

System 200 includes DA 202(a). In some examples, as shown, DA 202(a) is at least partially implemented within system 100, e.g., within device 100a, 100b, or 100c. For example, DA 202(a) is at least partially implemented as computer-executable instructions stored in memory(ies) 106. In some examples, DA 202(a) is distributed across multiple computers and/or systems. In some examples, some of the modules and functions of DA 202(a) are divided into a server portion and a client portion, where the client portion is implemented in one or more user devices (e.g., device 100a, 100b, 100c) or systems (e.g., system 100) and, optionally, communicates with the server portion via one or more networks. The various components and functions of DA 202(a) are implemented in hardware, software instructions for execution by one or more processors, firmware, including one or more signal processing and/or application specific integrated circuits, or a combination thereof. DA 202(a) is only one example of a DA, and DA 202(a) can have more or fewer components than shown, can combine two or more components, or can have a different configuration or arrangement of the components.

In some examples, DA 202(a) performs at least some of: converting speech input into text; identifying a user's intent from a received natural language input; eliciting (e.g., from the user) and obtaining information needed to fully satisfy the user's intent (e.g., by disambiguating phrases, names, etc.); determining a task flow for satisfying the identified intent; and executing the task flow.

In some examples, DA 202(a) includes natural language processor 206 configured to identify the user intent. Natural language processor 206 takes the candidate textual representation(s) generated by speech-to-text (STT) processor 204, and attempts to map each of the candidate text representations with one or more "intents" recognized by the DA. An "intent" (or "user intent") represents a DA performable task, and can have a corresponding task flow implemented in task flow processor 208. The corresponding task flow is a series of programmed actions that the DA takes for performing the task. Accordingly, in some examples, the DA's capabilities are dependent on the types of different task flows implemented in task flow processor 208, e.g., dependent on the different types of "intents" the DA recognizes.

Figure 2B:
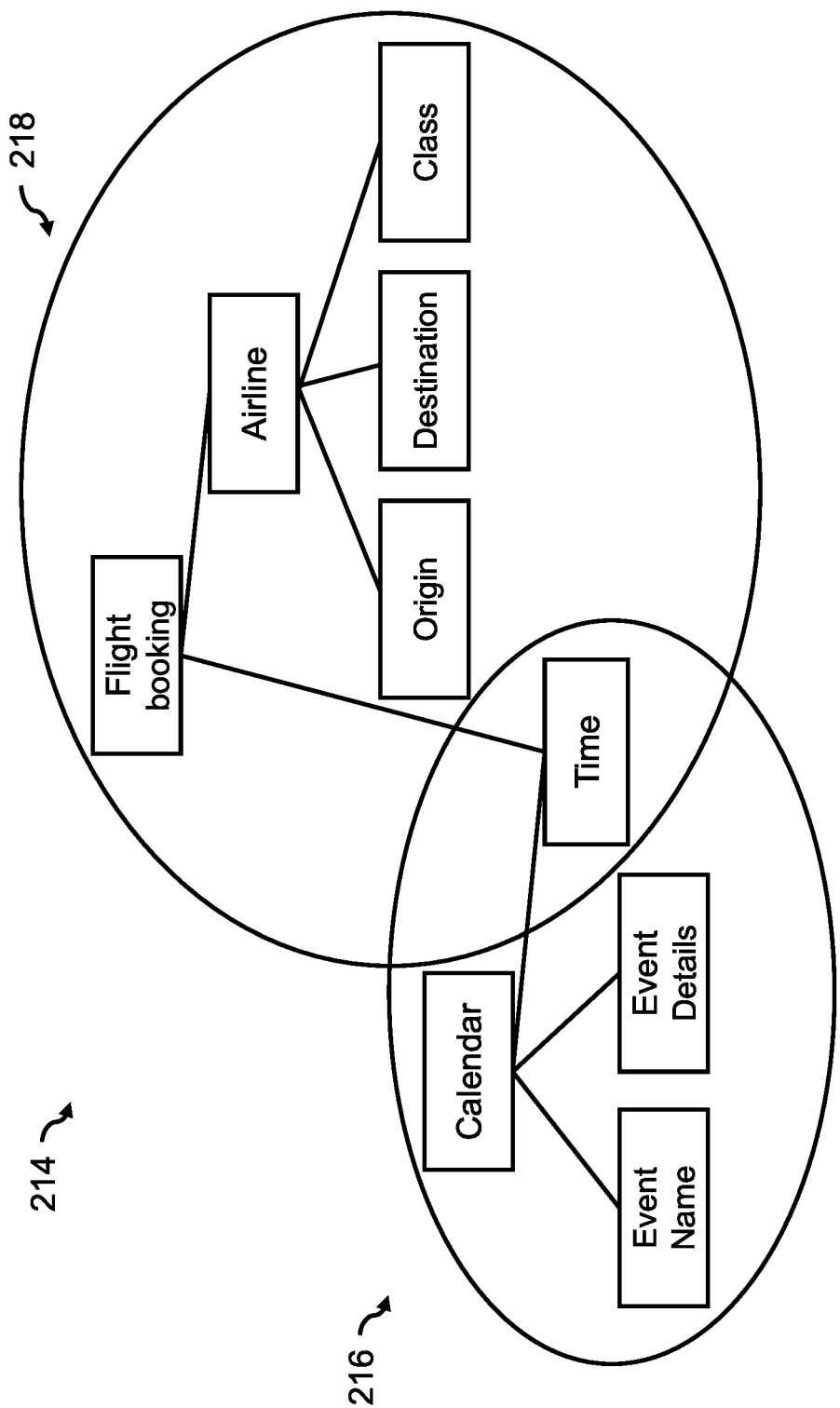
FIG. 2B illustrates an ontology used by (e.g., implemented within) a natural language processor to identify a user intent, according to various examples.

FIG. 2B illustrates ontology 214 used by (e.g., implemented within) natural language processor 206 to identify a user intent, according to various examples. Ontology 214 is a hierarchical structure having a plurality of nodes, each node representing either an intent or a "property" relevant to intent(s) or to another property. A "property" represents a parameter associated with an intent or a sub-characteristic of another property. A correspondence (e.g., linkage) between an intent node and a property node defines how a parameter represented by the property node relates to the task corresponding to the intent node.

Ontology 214 includes, for example, intent nodes and property nodes. Within ontology 214, each intent node links to property node(s) either directly or via intermediate property node(s). Similarly, each property node links to intent node(s) either directly or via intermediate property node(s). For example, as shown in FIG. 2B, ontology 214 includes a "flight booking" node (e.g., an intent node). Property nodes "airline" and "time" (for the flight) are each directly linked to the intent node (e.g., the "flight booking" node).

Further, property nodes "origin," "destination," and "class" are sub-nodes of the property node "airline," and are each linked to the "flight booking" node via the intermediate property node "airline." As another example, ontology 214 also includes a "calendar" node (e.g., another intent node). Property nodes "time" (for the calendar event), "event name," and "event details" are each linked to the "calendar" node. As the property "time" is relevant to both the task of booking a flight and the task of entering a calendar event, the property node "time" is linked to both the "flight booking" node and the "calendar" node.

A "domain" describes an intent node and its linked property nodes. Thus, each domain represents a respective intent, and refers to the group of nodes (and the relationships there between) associated with the respective intent. For example, ontology 214 includes an example of flight booking domain 218 and an example of calendar domain 216. Flight booking domain 218 includes the intent node "flight booking," property nodes "airline" and "time," and sub-property nodes "origin," "destination," and "class." Calendar domain 216 includes the intent node "calendar," and property nodes "event name," "event details," and "time." In some examples, ontology 214 includes many domains, e.g., where each domain shares property node(s) with other domain(s). For example, the "time" property node is shared between many different domains (e.g., a weather domain, a restaurant reservation domain, a movie ticket domain, etc.), in addition to calendar domain 216 and flight booking domain 218.

While FIG. 2B illustrates two example domains within ontology 214, other domains include, for example, "make a restaurant reservation," "play music," "provide navigation instructions," "set a timer," "send a message," "answer a question," and so on.

In some examples, ontology 214 includes all domains (and hence intents) that the DA can understand and act upon. Ontology 214 can be modified, e.g., by adding or removing entire domains or nodes or by modifying relationships between the nodes.

In some examples, nodes associated with multiple related intents are grouped into a "super-domain" in ontology 214. For example, a "travel" super-domain includes a group of property and intent nodes related to travel.

In some examples, a set of words and/or phrases relevant to the property or intent represented by a node is associated with the node. The respective set of words and/or phrases associated with each node can thus describe the node's associated "vocabulary." The vocabulary associated with each node is stored in a vocabulary index of DA 202(a) in association with the property or intent represented by the node. For example, in FIG. 2B, the vocabulary associated with the node for the property of "airline" includes words and phrases such as "flight," "vacation," "business trip," "airline," "travel," "boarding pass," "airport," "ticket," and so on. As another example, the vocabulary associated with the node for the intent of "initiate a phone call" includes words and phrases such as "call," "phone," "dial," "ring," "call this number," "make a call to," and so on.

Natural language processor 206 receives the candidate textual representations from STT processor 204 and determines, for each candidate textual representation, what nodes correspond to the words of the candidate textual representation. In some examples, if a word or phrase in the candidate text representation is determined to correspond to node(s) in ontology 214 (e.g., via the vocabulary index), the word or phrase "activates" those node(s). Based on the number and/or relative importance of the activated nodes, natural language processor 206 selects one of the intents as the user's intended task for the DA. In some examples, the domain having the highest confidence value (e.g., based on the relative importance of its activated nodes) is selected. In some examples, the domain having the most "activated" nodes is selected. In some examples, the domain is selected based on both of the number and the importance of the activated nodes. In some examples, additional factors are considered in selecting the domain, e.g., whether the DA previously successfully interpreted a similar request.

In some examples, once natural language processor 206 identifies an intent (or domain) based on the natural language input, natural language processor 206 causes task flow processor 208 to perform the actions required to satisfy the user request. For example, task flow processor 208 executes the task flow corresponding to the identified intent to perform a task to satisfy the user request. In some examples, performing the task includes providing audible, haptic, or displayed output indicating the results of the performed task.

DA 202(a) includes interaction handler 210. Interaction handler 210 is configured to determine whether a user (e.g., a participant in a copresence session) intends to initiate a public or private interaction with the DA. For example, as discussed below with respect to FIGS. 3A-3E, interaction handler 210 determines that a user intends to initiate a private DA interaction using data captured by sensor(s) of device 100a or 100c. In some examples, interaction handler 210 adjusts a manner of the DA interaction according to the determination. For example, if interaction handler 210 determines that the user intends to initiate a private DA interaction, interaction handler 210 prevents the user's request (e.g., speech input) and/or the DA's response (e.g., speech output) from being transmitted to other users participating in the copresence session. Interaction handler 210 is further described with respect to FIGS. 3A-3E below.

System 200 includes device 212. The architecture of device 212 is similar or identical to that of device 100*b* or 100*c*. For example, device 212 includes processor(s), memory(ies), RF circuitry(ies), communication bus(es), speaker(s), microphone(s), display(s), or a combination or sub-combination thereof. In some examples, device 212 is implemented as a smartphone, laptop or desktop computer, tablet device, wearable device (e.g., smart watch), a smart home device (e.g., smart speaker, smart TV, smart appliance), or combination or sub-combination thereof.

Device 212 is different from (e.g., external to) a device displaying a view corresponding to a copresence session. For example, external device 212 is implemented as device 100*b* or is a device different from devices 100*a*, 100*b*, and 100*c*. In some examples, external device 212 communicates with other devices (e.g., system 100) through a wired or wireless connection.

External device 212 implements, at least partially, DA 202(*b*). The architecture of DA 202(*b*) is similar or identical to that of DA 202(*a*) discussed above. For example, while FIG. 2A shows that DA 202(*b*) is implemented on a single device (e.g., external device 212), in other examples, DA 202(*b*) is distributed across multiple computers and/or systems, e.g., as a server portion and a client portion. It will be appreciated that DA 202(*b*) is capable of performing all of the functions described above with respect to DA 202(*a*), e.g., STT conversion, natural language processing, and task flow execution.

In some examples, while a device (e.g., 100*a* or 100*c*) displays, for a user, a view corresponding to a copresence session, external device 212 responds to the user's DA requests using DA 202(*b*). As discussed below with respect to FIGS. 3A-3D, using external device 212 to respond to user requests may allow DA interactions within copresence sessions to be (at least partially) private. Accordingly, in some examples, interaction handler 210 determines whether a user intends to initiate a private DA interaction by determining whether user audio input is intended for DA 202(*b*) operating on external device 212, e.g., as opposed to DA 202(*a*) operating on the device displaying the view.

FIGS. 3A-3D illustrate public and private DA interactions within a copresence session, according to various examples.

Figure 3A:
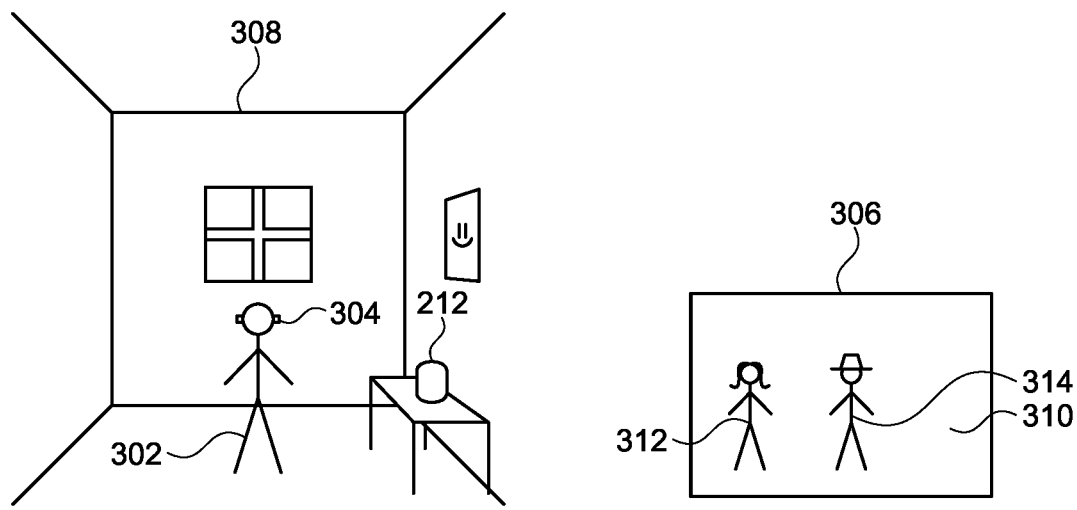
FIGS. 3A-3D illustrate public and private digital interactions within a copresence session, according to various examples.

FIG. 3A shows user 302 participating in a copresence session using device 304, e.g., a head mounted device worn by user 302. Device 304 is implemented as device 100*a* or 100*c*. The right panel of FIGS. 3A-3E shows display 306 of device 304, e.g., the current view of user 302.

In FIG. 3A, user 302 is located in physical environment 308, e.g., a physical room including a physical window and external device 212. Although user 302 physically faces the front of physical environment 308, user 302 views an XR environment displayed on display 306. The XR environment (e.g., including virtual room 310) corresponds to a copresence session including device 304 and second device(s), e.g., belonging to other respective user(s). For example, the XR environment includes avatars 312 and 314 respectively representing two other users. For example, user 302 and the other users have gathered in virtual room 310 for a conference.

In some examples, a shared communication channel for the copresence session allows communication (e.g., audio communication) between the users. The shared communication channel is implemented using any type of shared communication protocol implemented by device 304 and the other users' devices. For example, RF circuitry(ies) 104 and/or components of device 304 configured to enable communication in other frequency ranges implement the shared communication channel. The shared communication channel enables data exchange (e.g., audio data, video data, avatar location/pose data) between the users, e.g., the users' devices. For example, a microphone of device 304 samples audio input, and transmits, over the shared communication channel, the audio input to the devices of the other users, thus enabling user 302 to converse with the other users.

Figure 3B:
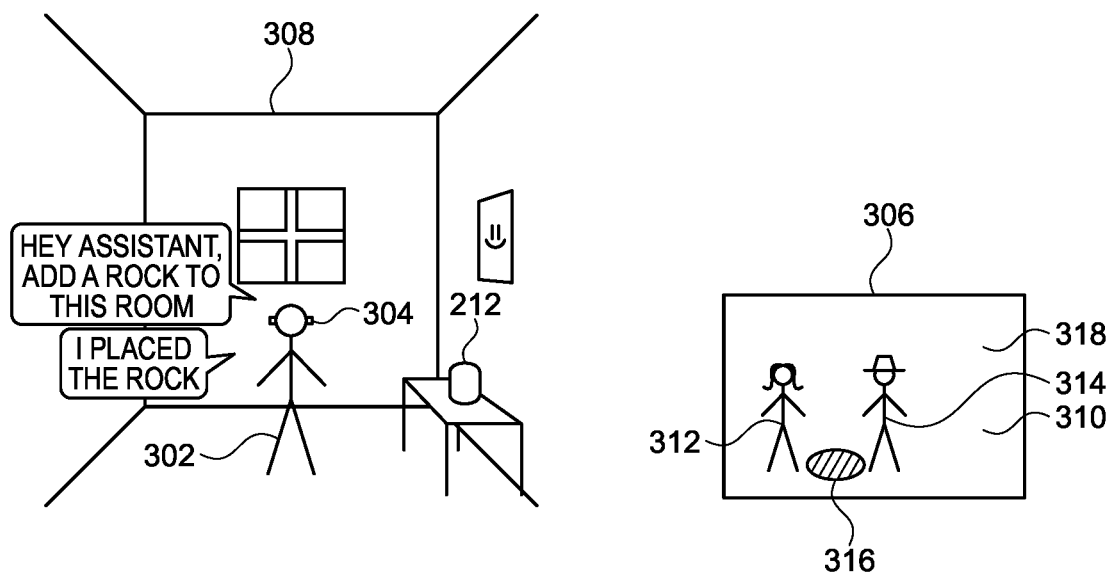

FIG. 3B illustrates an example public DA interaction within a copresence session. In FIG. 3B, user 302 issues a request to a DA by providing the audio input "Hey Assistant, add a rock to this room." A microphone of device 304 samples the audio input, and transmits, over the shared communication channel, the audio input to the other users, e.g., to the devices of the other users. A DA operating on device 304 (e.g., DA 202(*a*)) provides a response to the request. For example, the DA audibly responds "I placed the rock" and causes virtual rock 316 to be displayed and made visible to all users. Device 304 further transmits, over the shared communication channel, the audible response "I placed the rock" to the other users, e.g., to the devices of the other users. It will be appreciated that the instant example describes a public DA interaction, as the request to the DA (e.g., audio input) and the DA's response (e.g., the audible response and the displayed rock) are perceptible to the other users.

Figure 3C:
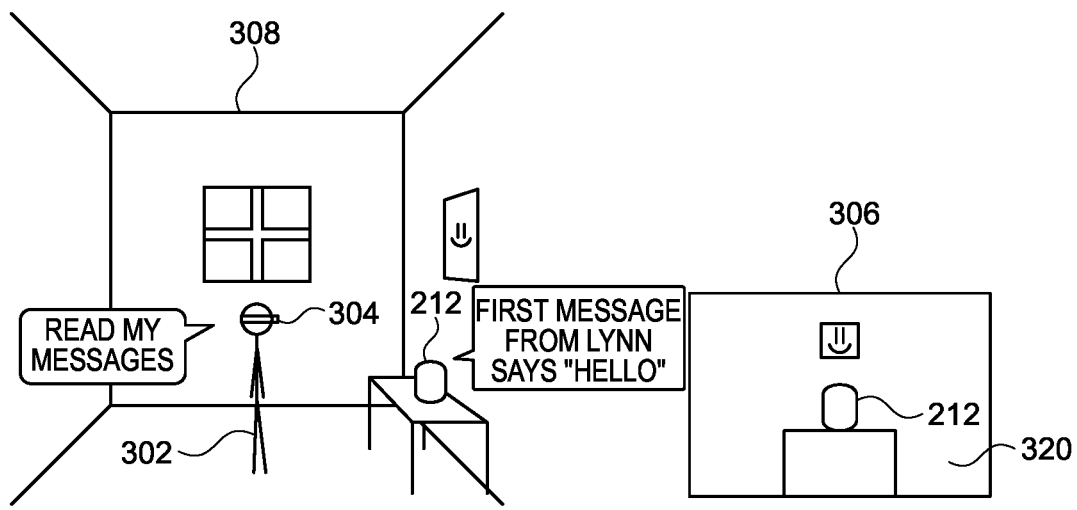
Figure 3D:
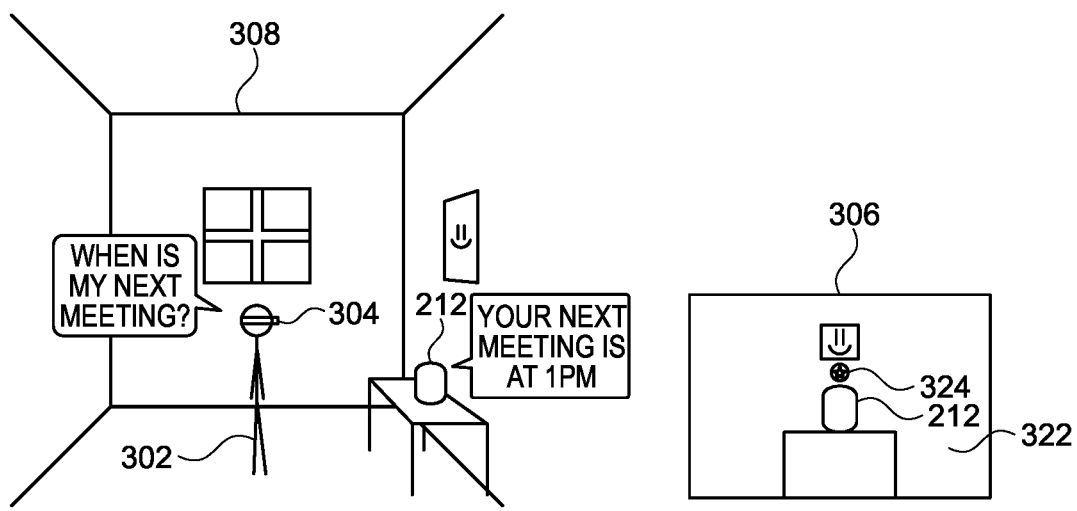

User 302 sometimes desires to interact with a DA privately, e.g., so that at least one of the user's requests to the DA and the DA's response are not perceptible to the other users. FIGS. 3C-3D illustrate using external device 212 to provide a private DA interaction within a copresence session. As discussed in detail below, user 302 may face (e.g., adjust their pose to face) external device 212 and issue a request to the DA while facing external device 212 to initiate a private DA interaction, e.g., with DA 202(*b*) operating on external device 212.

In FIG. 3B, displayed view 318 of the XR environment corresponds to a first pose associated with device 304. In some examples, a pose associated with device 304 includes a pose (e.g., head pose) of user 302 who wears device 304 and/or is authorized to use device 304. For example, the pose shown in FIG. 3B is a front facing pose of user 302. View 318 includes displayed representations of the other user(s) in the copresence session (e.g., avatars 312 and 314 associated with the other users' devices). However, view 318 does not include a displayed physical representation of external device 212. Device 304 does not display the physical representation because external device 212 is not visible from the first pose. For example, even if user 302 were not wearing device 304, external device 212 (located at the right side of physical environment 308) is not visible from the first pose (facing the front of physical environment 308).

In FIG. 3C, device 304 detects a change from the first pose to a second pose (e.g., head pose) associated with device 304. For example, as shown, user 302 has physically turned to face the right side of physical environment 308, e.g., face external device 212 and face away from avatars 312 and 314. External device 212 is thus visible from the second pose. In accordance with detecting the changed pose, device 304 replaces the display of view 318 (FIG. 3B) with a display of view 320 (FIG. 3C) of the XR environment, where view 320 corresponds to the second pose. As shown, view 320 includes a physical representation of external device 212 displayed at a physical location of external device 212, e.g., displayed via video pass-through.

In some examples, device 304 displays external device 212 (e.g., a physical representation of external device 212) in accordance with determining that external device 212 is visible from the current pose associated with device 304, e.g., user 302's current pose. In some examples, determining that external device 212 is visible from the current pose includes determining that external device 212 is located in a region corresponding to user 302's field of view in the current pose, e.g., user 302's current field of view if user 302 were not wearing device 304. For example, sensor(s) of device 304 detect external device 212 within a region representing (or approximating) user 302's current field of view. Further details about device 304 detecting (e.g., locating) external device 212 are discussed with respect to FIG. 4 below.

In the example of FIG. 3C, view 320 includes elements of physical environment 308 (e.g., a portrait and a table) in addition to external device 212. Accordingly, in some examples, if user 302 changes their pose to face away from the displayed representation(s) of the other user(s), device 304 adjusts the displayed view of the XR environment to display elements of physical environment 308, e.g., at their respective physical locations. For example, if device 304 detects that avatars 312 and 314 are not visible from user 302's current pose, device 304 displays physical environment 308 in a manner consistent with the current pose, e.g., via video pass-through. In other examples, device 304 displays external device 212 as the only physical element in view 320. For example, device 304 adjusts the displayed view of the virtual environment (e.g., virtual room 310) to correspond to user 302's changing pose, e.g., by displaying the right side of virtual room 310 in FIG. 3C. Device 304 further displays external device 212 as the only displayed physical element when external device 212 is visible from user 302's current pose.

In FIG. 3C, user 302 issues a request to a DA while facing external device 212. For example, user 302 says "read my messages." User 302 intends to initiate a private DA interaction, as user 302 may not want the other users to hear user 302's messages. Device 304 samples the audio input "read my messages." Device 304 further determines, using interaction handler 210, whether the audio input is intended to initiate a private DA interaction. For example, interaction handler 210 determines whether the audio input is intended for a DA operating on external device 212 (external DA) (e.g., DA 202(b)). In this manner, user 302 can initiate a private DA interaction by providing an audio input determined as being intended for the external DA.

The below discusses techniques interaction handler 210 uses to determine whether audio input is intended for the external DA.

In some examples, determining that audio input is intended for the external DA includes determining that a pose associated with device 304 (e.g., user 302's pose) corresponds to (e.g., user 302 faces) the physical location of external device 212 while sampling the audio input. For example, interaction handler 210 determines that a front facing direction of user 302's pose is directed at the physical location of external device 212 while sampling the audio input. Techniques for determining the physical location of external device 212 are discussed below.

In some examples, determining that the pose associated with device 304 corresponds to the physical location of external device 212 includes determining that a gaze (e.g., user 302's gaze) is directed at external device 212 (e.g., the displayed physical representation of external device 212). For example, device 304 includes image sensors configured to track user 302's eyes. Interaction handler 210 applies eye-tracking techniques on the captured image data to determine user 302's gaze direction. Interaction handler 210 determines whether the gaze direction is directed at external device 212 while sampling the audio input, e.g., while sampling the entirety of, or while sampling a portion of the audio input, e.g., start portion, middle portion, end portion.

In some examples, determining that the pose associated with device 304 corresponds to the physical location of external device 212 includes detecting external device 212 using sensor(s) of device 304. In some examples, the sensor(s) include a camera and/or sensor(s) configured to detect external device 212 via signals emitted by external device 212 and/or device 304, e.g., sensors using range finding technology. For example, interaction handler 210 analyzes image data captured by the camera to recognize external device 212 using object recognition technologies. In some examples, interaction handler 210 uses data from the sensor(s) to determine the location and distance of external device 212 relative to device 304.

Figure 4:
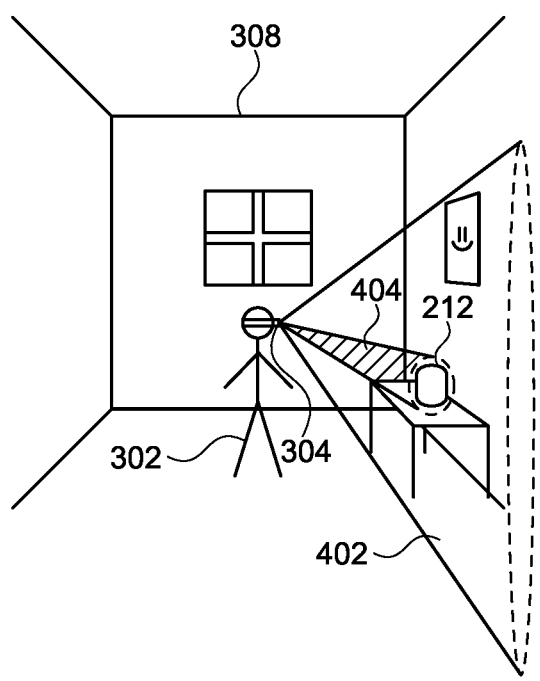
FIG. 4 illustrates detection of an external device in various regions, according to various examples.

In some examples, detecting external device 212 includes detecting external device 212 within a particular region. FIG. 4 illustrates detection of external device 212 in various regions, according to various examples. As shown, interaction handler 210 defines particular regions corresponding to user 302's pose. For example, region 402 corresponds to user 302's field of view in the current pose. Region 404, which is narrower than region 402, corresponds to a front facing direction of the current pose, e.g., so that user 302 is considered to face elements in region 404. Accordingly, interaction handler 210 can determine that user 302 faces external device 212 by detecting the device in a particular region corresponding to user 302's current pose, e.g., a current pose associated with device 304.

In some examples, determining that audio input is intended for the external DA includes determining that a direction of the audio input corresponds to (e.g., is directed at) the physical location of external device 212. For example, interaction handler 210 determines the direction of the audio input to be the front facing direction of user 302's current pose. As another example, interaction handler 210 implements sound localization techniques using multiple microphones of device 304 to determine the direction of the audio input.

In some examples, determining that audio input is intended for the external DA includes analyzing a content of the audio input. For example, a DA (e.g., DA 202(a) or 202(b)) performs natural language processing on the audio input to determine whether the audio input includes a request that requires personal data to satisfy. For example, the DA determines whether the audio input corresponds to a personal domain, e.g., a domain corresponding to an intent requiring the retrieval/use of personal data. Example personal data includes a user's health information, financial information, email messages, text messages, calendar information, notes, photos, videos, internet search history, and the like. In some examples, interaction handler 210 determines that the audio input is intended for the external DA if the audio input corresponds to a personal domain. In this manner, if user 302's request to a DA requires personal data to satisfy, device 304 can initiate a private DA interaction to satisfy the request.

In some examples, interaction handler 210 considers other factors to determine that audio input is intended for the external DA. For example, interaction handler 210 determines the recency and/or frequency of user 302's interactions with devices operating DAs. A determination that user 302 most recently interacted with and/or most frequently interacts with the external DA (e.g., DA 202 (*b*) operating on device 212) indicates an increased likelihood that the audio input is intended for the external DA. As another example, interaction handler 210 determines a distance between device 212 and device 304 when device 304 samples the audio input. A determination that the distance is less than a threshold distance (e.g., 10 feet, 20 feet) indicates an increased likelihood that the audio input is intended for the external DA. As yet another example, interaction handler 210 determines whether user 302 has registered external device 212, e.g., in a list of devices associated with user 302 or in a list of devices in user 302's home. A determination that user 302 has registered external device 212 indicates an increased likelihood that the audio input is intended for the external DA.

In some examples, interaction handler 210 determines whether audio input is intended for the external DA without identifying a spoken trigger (e.g., a predetermined phrase for initiating a DA) in the audio input. For example, by considering the above-described factors, interaction handler 210 can determine whether audio input is intended for a DA without identifying explicit indications (e.g., a spoken trigger, button press) that the audio is intended for a DA.

In some examples, in accordance with determining that audio input is intended for the external DA, interaction handler 210 disables, at least partially, the shared communication channel. For example, device 304 forgoes transmitting any audio, such as audio input sampled by device 304 and DA generated audio, over the shared communication channel. In some examples, disabling the shared communication channel further includes forgoing outputting incoming audio received through the shared communication channel, e.g., audio from the respective device(s) of the other user(s).

In some examples, in accordance with a determination that audio input is intended for the external DA, interaction handler 210 causes the external DA to provide an audible response to the audio input. The audible response is not transmitted to the device(s) of the other user(s) over the shared communication channel, thereby preserving privacy of the DA interaction. For example, the external DA provides the audible response while the shared communication channel is at least partially disabled.

In some examples, causing the external DA to provide the audible response includes causing external device 212 to provide the audible response with speaker(s) of external device 212. For example, in FIG. 3C, device 304 transmits the sampled audio input "read my messages" to external device 212 and instructs the external DA to respond to the request. As shown, external device 212 thus provides the audible response "first message from Lynn says 'hello'" with its internal speaker(s).

In some examples, causing the external DA to provide the audible response includes receiving, by device 304, the audible response from external device 212 and outputting, using speaker(s) of device 304, the audible response. For example, device 304 transmits the audio input "read my messages" to external device 212 and instructs the external DA to determine a response to the request and transmit the response to device 304. Upon receiving the response (e.g., "first message from Lynn says 'hello'"), device 304 audibly outputs the response.

Device 304 may or may not transmit the audio input (e.g., "read my messages") over the shared communication channel to the device(s) of the other user(s). As an example of not transmitting the audio input, interaction handler 210 determines whether each sampled audio input is intended for the external DA, and only allows transmission of audio inputs determined as not intended for the external DA. For example, if interaction handler 210 determines that audio input is intended for the external DA, interaction handler 210 disables the shared communication channel before device 304 transmits the audio input. In this manner, the user's request to the DA may not be revealed to the other user(s).

In other examples, interaction handler 210 allows transmission of the audio input even if interaction handler 210 determines (e.g., in accordance with interaction handler 210 determining) that the audio input is intended for the external DA. For example, if interaction handler 210 determines that the audio input is intended for the external DA, interaction handler 210 first allows transmission of the audio input, and then disables the shared communication channel. As another example, device 304 may have already transmitted at least a portion of the audio input before interaction handler 210 disables the shared communication channel (e.g., if interaction handler 210 cannot disable the communication channel quickly enough). Thus, in some instances, the other user(s) can perceive user 302's request to a DA (e.g., "read my messages") but not the DA's response to the request.

In some examples, interaction handler 210 determines that audio input is not intended for an external DA. For example, interaction handler 210 cannot determine that the audio input is intended for the external DA according to the techniques discussed above. In some examples, in accordance with determining that the audio input is not intended for the external DA, interaction handler 210 forgoes causing the external DA to provide the audible response. In some examples, in accordance with such determination, interaction handler 210 does not disable the shared communication channel and instead transmits the audio input over the shared communication channels to the device(s) of the other user(s).

In some examples, after disabling the shared communication channel, interaction handler 210 (re) activates the shared communication channel. For example, interaction handler 210 allows device 304 to transmit audio input, such as audio sampled by device 304 and audible DA responses, over the shared communication channel to the device(s) of the other user(s). In some examples, interaction handler 210 further allows device 304 to output audio received from the respective device(s) of the other user(s).

In some examples, interaction handler 210 activates the shared communication channel after (e.g., a predetermined duration after) the audible DA response is provided. In some examples, interaction handler 210 activates the shared communication channel in accordance with device 304 not sampling an audio input determined as intended for the external DA (e.g., not sampling audio input intended to continue a private DA interaction) within a predetermined duration after the audible DA response is provided. In this manner, after concluding a private DA interaction, user 302 can resume conversing with the other user(s) in the copresence session.

FIG. 3D shows another example of using external device 212 to provide private DA interactions with a copresence session. In FIG. 3D, similar to FIG. 3C, user 302 faces (e.g., has turned from FIG. 3B to face) external device 212. Device 304 thus displays view 322 corresponding to user 302's current pose.

View 322 shows that device 304 displays DA indicator 324 concurrently with external device 212 in the XR environment. For example, device 304 displays DA indicator 324 directly above (e.g., a predetermined distance directly above) external device 212, e.g., above external device 212 at a location defined by the vertical axis of external device 212. As discussed below, concurrently displaying DA indicator 324 with external device 212 can indicate that a private DA interaction is initiated.

In some examples, device 304 concurrently displays DA indicator 324 with external device 212 in accordance with determining that a current pose associated with device 304 (e.g., the current pose of user 302) corresponds to the physical location of external device 212, e.g., according to the techniques discussed above. For example, if device 304 determines that user 302 faces external device 212, device 304 displays DA indicator 324 concurrently with external device 212.

In some examples, device 304 samples an audio input including a spoken trigger for initiating the external DA (e.g., "Hey Assistant"). In some examples, device 304 concurrently displays DA indicator 324 with external device 212 in accordance with determining that the audio input includes the spoken trigger. In some examples, device 304 displays DA indicator 324 further in accordance with determining that a current pose associated with device 304 corresponds to the physical location of external device 212 while sampling the audio input including the spoken trigger. For example, device 304 displays DA indicator 324 if user 302 says "Hey Assistant" while facing external device 212.

In some examples, interaction handler 210 considers any audio input sampled while device 304 concurrently displays DA indicator 324 with external device 212 to be audio input intended for the external DA, e.g., audio input for initiating a private DA interaction.

In some examples, while device 304 concurrently displays DA indicator 324 and external device 212, interaction handler 210 disables the shared communication channel. Accordingly, the display of DA indicator 324 can inform user 302 that a private DA interaction is initiated (as the shared communication channel is disabled).

For example, in FIG. 3D, while device 304 concurrently displays DA indicator 324 and external device 212, user 302 issues a DA request. For example, user 302 asks "when is my next meeting?" Device 304 samples the audio input "when is my next meeting?". Interaction handler 210 determines that the audio input is intended for the external DA and thus causes the external DA to provide an audible response to the audio input. For example, external device 212 outputs "your next meeting is at 1 pm." Neither the audio input nor the DA's audible response is transmitted over the shared communication channel, e.g., as the shared communication channel is disabled.

In some examples, after disabling the shared communication channel, interaction handler 210 activates the shared communication channel. In some examples, device 304 activates the shared communication channel in accordance with ceasing to display DA indicator 324. Accordingly, ceasing to display DA indicator 324 can inform user 302 that a private DA interaction has concluded and that the shared communication channel is active.

In some examples, ceasing to display DA indicator 324 and/or activating the shared communication channel is performed in accordance with determining that device 304 does not sample another audio input within a predetermined duration after (e.g., 3 seconds, 5 seconds) the audible response is provided. For example, if user 302 does not provide another audio input (e.g., a follow-up DA request) within a predetermined duration after external device 212 outputs "your next meeting is at 1 pm," device 304 ceases to display DA indicator 324 and activates the shared communication channel.

In some examples, ceasing to display DA indicator 324 and/or activating the shared communication channel is performed in accordance with device 304 receiving an input (e.g., speech input, gesture input, button input) representing an instruction to activate the shared communication channel. For example, user 302 provides an input (e.g., says "I'm done") to cause device 304 to cease to display DA indicator 324 and activate the shared communication channel.

In some examples, ceasing to display DA indicator 324 and/or activating the shared communication channel is performed in accordance with determining that a current pose associated with device 304 (e.g., the current pose of user 302) does not correspond to (e.g., no longer corresponds to) the physical location of external device 212. For example, if user 302 in FIG. 3D changes pose to not face external device 212, device 304 ceases to display DA indicator 324 and activates the shared communication channel.

Accordingly, the above discussed techniques can allow a user engaged in a copresence session to face (e.g., turn to face) external device 212 to initiate a private DA interaction. The user can then face away from external device 212 to conclude the private DA interaction, e.g., to resume interacting with the other user(s) of the copresence session.

Sometimes, the external DA is incapable of responding to a request included in audio input, despite the audio input being determined as intended for the external DA. For example, external device 212 operating the external DA (e.g., 202(b)) may lack the capability (e.g., hardware or software requirements) to satisfy the request, or the external DA may lack access to information needed to satisfy the request. For example, suppose user 302 provides the audio input "who's in this virtual room?" and interaction handler 210 determines that the audio input is intended for the external DA. The external DA is incapable of responding to the request. For example, because external device 212 does not implement the copresence session, the external DA may lack access to information needed to satisfy requests about virtual environments of the copresence session. The below discusses techniques by which a DA may respond to such requests, e.g., while maintaining privacy of the DA's response.

In some examples, in accordance with determining that audio input is intended for the external DA, interaction handler 210 receives, from external device 212, an indication that the external DA is incapable of responding to a request included in the audio input. In some examples, in accordance with receiving the indication, interaction handler 210 determines whether a DA operating on device 304 (e.g., DA 202(a)) is capable of responding to the request, e.g., based on the hardware/software configuration of device 304 and/or based on the information DA 202(a) can access. For example, interaction handler 210 determines that DA 202(a) is capable of responding to the request "who's in this virtual room?" because DA 202(a) can access information about virtual room 310.

In some examples, in accordance with determining that DA 202(a) is capable of responding to the request, interaction handler 210 causes an audible response to the request to be output using DA 202(a). For example, interaction handler 210 causes DA 202(a) to determine the response (e.g., determine who is in virtual room 310) and audibly output the response at device 304 or at external device 212. For example, DA 202(*a*) determines the response "Jessica and Lynn are in this virtual room," interaction handler 210 transmits the response to external device 212, and external device 212 speaks the response. It will be appreciated that the response can be provided while the shared communication channel is disabled (e.g., as interaction handler 210 determines that the audio input is intended for the external DA and thus disabled the shared communication channel), thereby maintaining privacy of the DA response.

In some examples, if both DAs operating on respective devices 304 and 212 (e.g., DAs 202(*a*) and 202(*b*)) are incapable of responding to the request, interaction handler 210 attempts to identify another DA (operating on a device external to devices 304 and 212) capable of responding to the request. For example, interaction handler 210 identifies the correct DA/device based on the hardware/software configuration of the correct device and/or based on information accessible to the correct DA. In some examples, in accordance with identifying the correct DA/device, interaction handler 210 causes the correct DA to provide an audible response to the request, e.g., at the correct device, at device 304, or at external device 212.

Figure 3E:
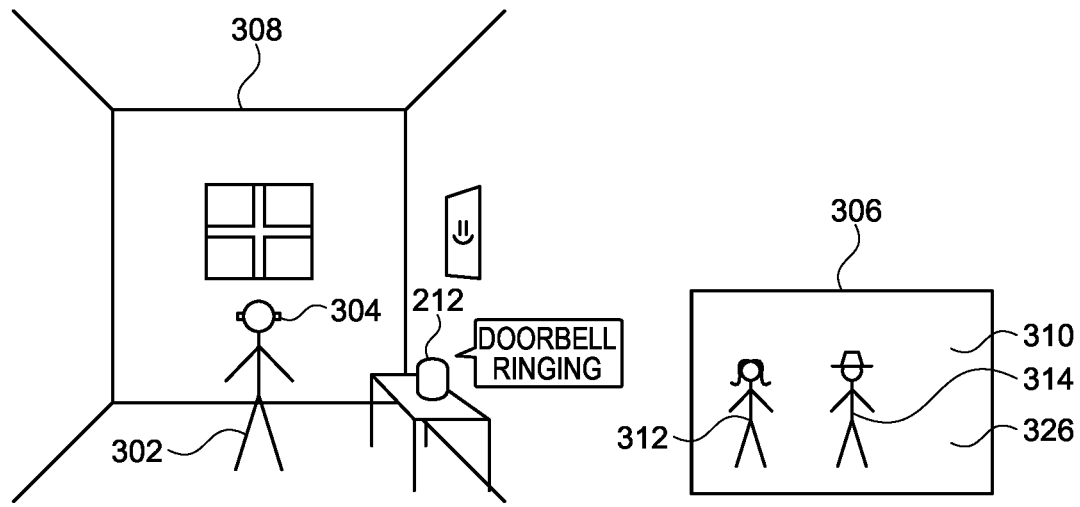
FIG. 3E illustrates using an external device to provide notifications during a copresence session, according to various examples.

FIG. 3E illustrates using external device 212 to provide notifications during a copresence session, according to various examples. In FIG. 3E, similar to FIGS. 3A-3D, user 302 is engaged in a copresence session including the device 304 and second device(s), e.g. of the other user(s). For example, device 304 displays view 326 of an XR environment, e.g., while a shared communication channel for the copresence session is active.

In some examples, while device 304 displays the XR environment, device 304 receives a notification, e.g., a notification from an external electronic device or a notification generated by device 304. Example notifications include message notifications (e.g., text message, email message), voice notifications (e.g., a voice message), system generated notifications (e.g., indicating a battery status or software update), and application notifications (e.g., a notification from a flight booking application, ride hailing application, and the like). User 302 may desire to keep such notifications private (e.g., not allow the other users to perceive the notifications), as such notifications may reveal the user's personal information. Accordingly, the below discusses techniques for privately providing notifications within copresence sessions.

In some examples, in accordance with receiving the notification, interaction handler 210 determines whether device 304 (e.g., user 302) is engaged in a copresence session. For example, device 304 determines whether display 306 displays an XR environment for the copresence session and/or whether a shared communication channel for the copresence session is active. In some examples, in accordance with determining that user 302 is not engaged in a copresence session, device 304 provides the audio output representing the notification with its internal speakers. In some examples, in accordance with determining that user 302 is engaged in the copresence session, interaction handler 210 disables a shared communication channel for the copresence session and causes the audio output representing the notification to be provided, e.g., while the shared communication channel is disabled. In this manner, device 304 can privately provide the notification by not transmitting the audibly output notification to the other users, e.g., to the other users' devices.

In some examples, causing the audio output representing the notification to be provided includes causing external device 212 to provide the audio output or providing the audio output at device 304.

For example, in FIG. 3E, while device 304 is engaged in the copresence session, device 304 receives a notification indicating that user's 302 doorbell is ringing. For example, an application on device 304 configured to monitor user 302's home devices (e.g., doorbell, home appliances, and the like) generates the notification. In accordance with receiving the notification, device 304 determines that it is engaged in the copresence session. Interaction handler 210 thus disables the shared communication channel and causes external device 212 to audibly output "doorbell ringing" while the shared communication channel is disabled.

In some examples, in accordance with determining that device 304 is engaged in the copresence session, interaction handler 210 causes external device 212 to provide the audio output representing the notification without disabling the shared communication channel and without providing the audio output at device 304. This may reduce the notification's disruption to user 302's conversation with the other users, e.g., as device 304 does not simultaneously speak the notification and output speech from the other users.

Figure 5:
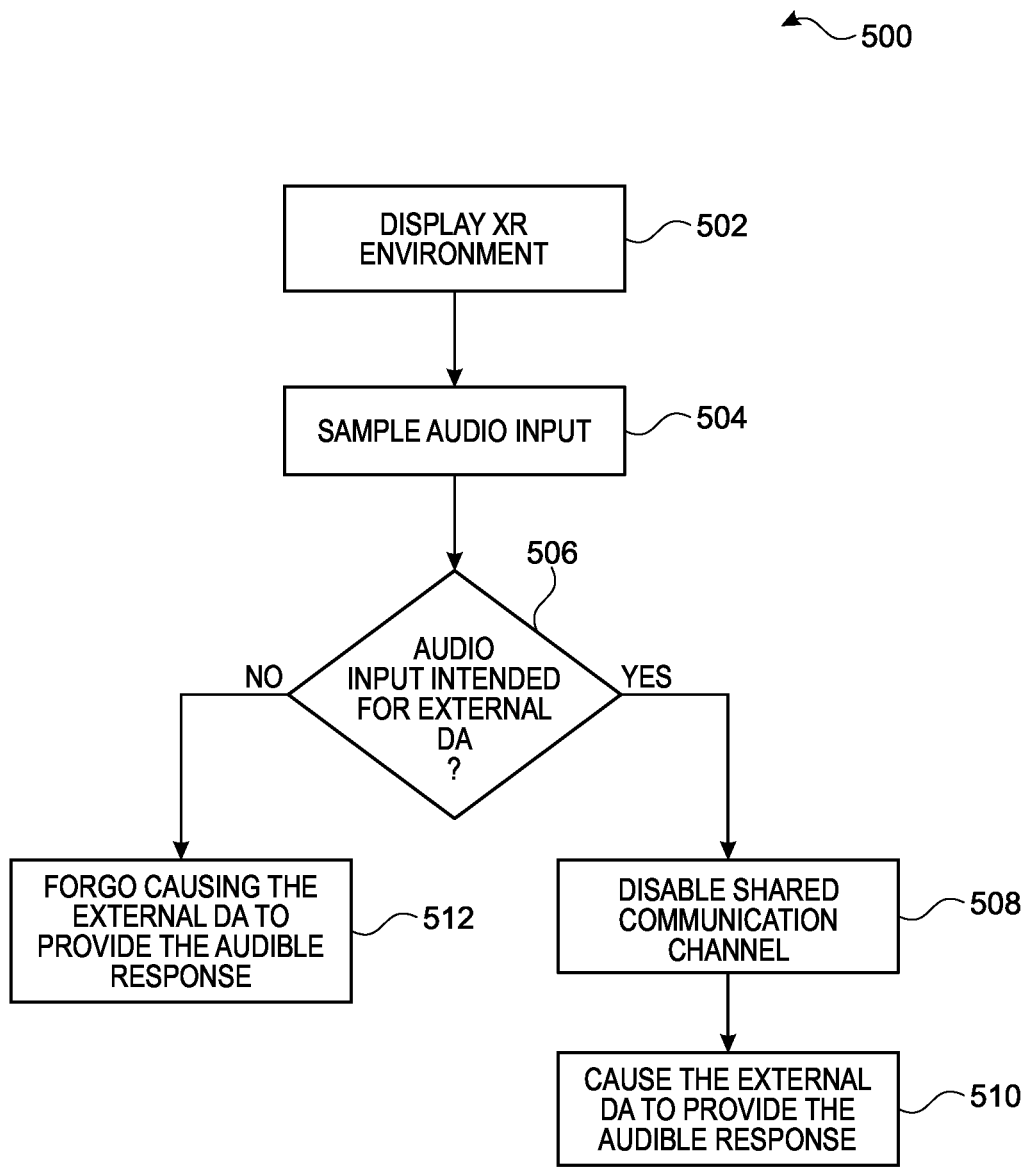
FIG. 5 is a flow diagram illustrating a process for digital assistant interaction, according to various examples.

FIG. 5 is a flow diagram illustrating process 500 for digital assistant interaction, according to various examples. Process 500 is performed, for example, at a device (e.g., device 304) and using system 200. In process 500, some operations are, optionally, combined, the orders of some operations are, optionally, changed, and some operations are, optionally, omitted. In some examples, additional operations are performed in combination with process 500.

In some examples, at block 502, an extended reality (XR) environment corresponding to a copresence session including an electronic device (e.g., device 304) and a second electronic device (e.g., another instance of device 304) is displayed on a display (e.g., display 306). In some examples, a physical representation of an external electronic device (e.g., external device 212) is displayed in the XR environment. In some examples, displaying the XR environment includes: displaying a first view of the XR environment (e.g., view 318), the first view corresponding to a first pose associated with the electronic device, where: the first view includes an avatar associated with the second electronic device (e.g., avatars 312 and 314); and the first view does not include the physical representation of the external electronic device.

In some examples, a change from the first pose associated with the electronic device to a second pose associated with the electronic device is detected (e.g., by device 304), where the external electronic device is visible from the second pose but not from the first pose. In some examples, in accordance with detecting the change: the display of the first view is replaced with a display of a second view of the XR environment (e.g., view 320), the second view corresponding to the second pose, where the second view includes the physical representation of the external electronic device displayed at a physical location of the external electronic device.

In some examples, at block 504, while displaying the XR environment, a first audio input is sampled with a microphone of the electronic device.

In some examples, at block 506, it is determined (e.g., by interaction handler 210) whether the first audio input is intended for a first digital assistant (e.g., DA 202(*b*)) operating on the external electronic device. In some examples, the physical representation of the external electronic device is displayed at a second physical location of the external electronic device, and determining whether the first audio input is intended for the first digital assistant operating on the external electronic device includes: determining that a pose associated with the electronic device corresponds to (e.g., the user faces) the second physical location while sampling the first audio input.

In some examples, determining that the pose corresponds to the second physical location while sampling the first audio input includes determining that a gaze (e.g., of the user) is directed at the physical representation while sampling the first audio input.

In some examples, determining that the pose corresponds to the second physical location while sampling the first audio input includes detecting, using one or more sensors of the electronic device, the external electronic device. In some examples, the one or more sensors include a camera and detecting the external electronic device using the one or more sensors includes recognizing the external electronic device from image data captured by the camera.

In some examples, determining whether the first audio input is intended for the first digital assistant includes determining whether a direction of the first audio input corresponds to a fourth physical location of the external electronic device.

In some examples, determining whether the first audio input is intended for the first digital assistant includes analyzing a content of the first audio input. In some examples, determining whether the first audio input is intended for the first digital assistant includes determining whether the first audio input corresponds to a personal domain.

In some examples, determining whether the first audio input is intended for the first digital assistant is performed without identifying a second spoken trigger in the first audio input.

In some examples, a digital assistant indicator (e.g., DA indicator 324) is concurrently displayed with the physical representation of the external electronic device in the XR environment. In some examples, determining that the first audio input is intended for the first digital assistant includes determining that the first audio input is sampled while the digital assistant indicator is concurrently displayed with the physical representation. In some examples, concurrently displaying the digital assistant indicator with the physical representation includes displaying the digital assistant indicator above the physical representation at a location defined by the vertical axis of the physical representation.

In some examples, a second audio input is sampled before sampling the first audio input. In some examples, concurrently displaying the digital assistant indicator with the physical representation includes concurrently displaying the digital assistant indicator with the physical representation in accordance with a determination that the second audio input includes a spoken trigger for the first digital assistant.

In some examples, the physical representation is displayed at a third physical location of the external electronic device, and concurrently displaying the digital assistant indicator with the physical representation includes concurrently displaying the digital assistant indicator with the physical representation in accordance with a determination that a third pose associated with the electronic device corresponds to the third physical location.

In some examples, at block 508, in accordance with a determination (e.g., by interaction handler 210) that the first audio input is intended for the first digital assistant, a shared communication channel for the copresence session is disabled (e.g., by interaction handler 210).

In some examples, at block 510, in accordance with a determination that the first audio input is intended for the first digital assistant, the first digital assistant is caused (e.g., by interaction handler 210) to provide an audible response to the first audio input. The audible response is not transmitted to the second device over a shared communication channel for the copresence session. For example, the audible response is provided while the shared communication channel is disabled. In some examples, causing the first digital assistant to provide the audible response that is not transmitted over the shared communication channel is performed in accordance with a determination that the first audio input corresponds to the personal domain.

In some examples, causing the first digital assistant to provide the audible response includes causing the external electronic device (e.g., external device 212) to provide the audible response with one or more speakers of the external electronic device. In some examples, causing the first digital assistant to provide the audible response includes receiving (e.g., by device 304), from the external electronic device, the audible response, and outputting, using one or more speakers of the electronic device (e.g., device 304), the audible response.

In some examples, the shared communication channel is disabled (e.g., by interaction handler 210) while concurrently displaying the digital assistant indicator with the physical representation. In some examples, disabling the shared communication channel includes forgoing transmitting, over the shared communication channel, audio to the second electronic device, where the first digital assistant provides the audible response while the shared communication channel is disabled. In some examples, disabling the shared communication channel further includes forgoing outputting, at the electronic device (e.g., device 304), audio received at the second electronic device.

In some examples, after disabling the shared communication channel, the shared communication channel is activated (e.g., by interaction handler 210). In some examples, activating the shared communication channel includes transmitting, over the shared communication channel, audio sampled by the microphone (e.g., of device 304) to the second electronic device. In some examples, activating the shared communication channel is performed in accordance with determining (e.g., by interaction handler 210) that a third audio input is not sampled within a predetermined duration after providing the audible response. In some examples, the digital assistant indicator ceases to be displayed and activating the shared communication channel is performed in accordance with ceasing to display the digital assistant indicator.

In some examples, at block 512, in accordance with a determination that the first audio input is not intended for the first digital assistant operating on the external electronic device, causing the first digital assistant to provide the audible response is forgone (e.g., by interaction handler 210).

In some examples, the first audio input is transmitted (e.g., by interaction handler 210) over the shared communication channel to the second electronic device. In some examples, transmitting the first audio input is performed in accordance with a determination that the first audio input is intended for the first digital assistant.

In some examples, in accordance with a determination that the first audio input is intended for the first digital assistant operating on the external electronic device: an indication that the first digital assistant (e.g., DA 202(b)) is incapable of responding to a request included in the first audio input is received (e.g., by interaction handler 210). In some examples, in accordance with receiving the indication: it is determined (e.g., by interaction handler 210) whether a second digital assistant (e.g., DA 202(a)) operating on the electronic device (e.g., device 304) is capable of responding to the request. In some examples, in accordance with a determination that the second digital assistant is capable of responding to the request, a second audible response to the request is output using the second digital assistant, where causing the first digital assistant to provide the audible response is performed in accordance with not receiving the indication.

In some examples, while displaying the XR environment, a notification is received (e.g., by device 304). In some examples, in accordance with receiving the notification, it is determined (e.g., by interaction handler 210) whether the electronic device (e.g., device 304) is engaged in the copresence session. In some examples, in accordance with a determination that the electronic device is engaged in the copresence session, the external electronic device is caused (e.g., by interaction handler 210) to provide an audio output representing the notification.

The operations discussed above with respect to FIG. 5 are optionally implemented by the components depicted in FIGS. 2A-2B, e.g., by system 100, DA 202(a), external device 212, and DA 202(b).

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

Various processes described herein contemplate the option of obtaining and using a user's personal information. For example, such personal information can be used to provide private DA interactions. However, if such personal information is obtained, such information should be obtained with the user's informed consent. Specifically, the user should have knowledge of and control over how devices use their personal information.

Appropriate parties will use personal information only for reasonable and legitimate purposes. These parties will abide by privacy policies and practices that at least comply with appropriate laws and regulations. Further, such policies should be user-accessible, well-established, and recognized as compliant with (or to exceed) governmental/industry standards. Additionally, these parties will not sell, distribute, or otherwise share personal information for any unreasonable or illegitimate purposes.

Users may also limit the degree to which such parties may access or otherwise obtain personal information. For instance, user settings or other preferences can be changed to allow users to decide whether their personal information is accessible by various entities. Furthermore, while some features described herein are described to include use of personal information, various aspects of these features may be implemented without needing use of such information. For example, if user location history is collected, this information can be obscured or otherwise generalized such that the information does not identify the corresponding user.

What is claimed is:

1. A non-transitory computer-readable storage medium storing one or more programs, the one or more programs comprising instructions, which when executed by one or more processors of a first electronic device having a display and a microphone, cause the first electronic device to:
   display, on the display, an extended reality (XR) environment corresponding to a copresence session that includes a first user associated with the first electronic device and a second user associated with a second electronic device, wherein the first user is different from the second user and the first electronic device is different from the second electronic device, and wherein the copresence session is configured such that the first user and the second user simultaneously experience a shared environment; and
   while displaying the XR environment corresponding to the copresence session:
      sample, with the microphone, a first audio input;
      determine whether the first audio input is intended for a first digital assistant operating on an external electronic device; and
      in accordance with a determination that the first audio input is intended for the first digital assistant:
         cause the first digital assistant to provide an audible response to the first audio input, wherein the audible response is not transmitted to the second electronic device over a shared communication channel for the copresence session.

2. The non-transitory computer-readable storage medium of claim 1, wherein the one or more programs further comprise instructions, which when executed by the one or more processors, cause the first electronic device to:
   in accordance with a determination that the first audio input is not intended for the first digital assistant operating on the external electronic device:
      forgo causing the first digital assistant to provide the audible response.

3. The non-transitory computer-readable storage medium of claim 1, wherein the one or more programs further comprise instructions, which when executed by the one or more processors, cause the first electronic device to:
   transmit, over the shared communication channel, the first audio input to the second electronic device.

4. The non-transitory computer-readable storage medium of claim 3, wherein transmitting the first audio input is performed in accordance with a determination that the first audio input is intended for the first digital assistant.

5. The non-transitory computer-readable storage medium of claim 1, wherein the one or more programs further comprise instructions, which when executed by the one or more processors, cause the first electronic device to:
   determine whether the first audio input corresponds to a personal domain, wherein causing the first digital assistant to provide the audible response that is not transmitted over the shared communication channel is performed in accordance with a determination that the first audio input corresponds to the personal domain.

6. The non-transitory computer-readable storage medium of claim 1, wherein the one or more programs further comprise instructions, which when executed by the one or more processors, cause the first electronic device to:
display, in the XR environment, a physical representation of the external electronic device.

7. The non-transitory computer-readable storage medium of claim 6, wherein displaying the XR environment includes:
displaying a first view of the XR environment, the first view corresponding to a first pose associated with the first electronic device, wherein:
the first view includes an avatar associated with the second electronic device; and
the first view does not include the physical representation of the external electronic device.

8. The non-transitory computer-readable storage medium of claim 7, wherein the one or more programs further comprise instructions, which when executed by the one or more processors, cause the first electronic device to:
detect a change from the first pose associated with the first electronic device to a second pose associated with the first electronic device, wherein the external electronic device is visible from the second pose but not from the first pose; and
in accordance with detecting the change:
replace the display of the first view with a display of a second view of the XR environment, the second view corresponding to the second pose, wherein:
the second view includes the physical representation of the external electronic device displayed at a physical location of the external electronic device.

9. The non-transitory computer-readable storage medium of claim 6, wherein the physical representation is displayed at a physical location of the external electronic device, and wherein determining whether the first audio input is intended for the first digital assistant operating on the external electronic device includes:
determining that a pose associated with the first electronic device corresponds to the physical location while sampling the first audio input.

10. The non-transitory computer-readable storage medium of claim 9, wherein determining that the pose corresponds to the physical location while sampling the first audio input includes:
determining that a gaze is directed at the physical representation while sampling the first audio input.

11. The non-transitory computer-readable storage medium of claim 9, wherein determining that the pose corresponds to the physical location while sampling the first audio input includes:
detecting, using one or more sensors of the first electronic device, the external electronic device.

12. The non-transitory computer-readable storage medium of claim 11, wherein the one or more sensors include a camera and detecting the external electronic device using the one or more sensors includes:
recognizing the external electronic device from image data captured by the camera.

13. The non-transitory computer-readable storage medium of claim 6, wherein the one or more programs further comprise instructions, which when executed by the one or more processors, cause the first electronic device to:
concurrently display, in the XR environment, a digital assistant indicator with the physical representation, wherein determining that the first audio input is intended for the first digital assistant includes determining that the first audio input is sampled while the digital assistant indicator is concurrently displayed with the physical representation.

14. The non-transitory computer-readable storage medium of claim 13, wherein concurrently displaying the digital assistant indicator with the physical representation includes displaying the digital assistant indicator above the physical representation at a location defined by the vertical axis of the physical representation.

15. The non-transitory computer-readable storage medium of claim 13, wherein the one or more programs further comprise instructions, which when executed by the one or more processors, cause the first electronic device to:
before sampling the first audio input, sample a second audio input, and wherein concurrently displaying the digital assistant indicator with the physical representation includes:
concurrently displaying the digital assistant indicator with the physical representation in accordance with a determination that the second audio input includes a spoken trigger for the first digital assistant.

16. The non-transitory computer-readable storage medium of claim 13, wherein the physical representation is displayed at a physical location of the external electronic device, and wherein concurrently displaying the digital assistant indicator with the physical representation includes:
concurrently displaying the digital assistant indicator with the physical representation in accordance with a determination that a pose associated with the first electronic device corresponds to the physical location.

17. The non-transitory computer-readable storage medium of claim 13, wherein the one or more programs further comprise instructions, which when executed by the one or more processors, cause the first electronic device to:
while concurrently displaying the digital assistant indicator with the physical representation, disable the shared communication channel, including:
forgoing transmitting, over the shared communication channel, audio to the second electronic device, wherein the first digital assistant provides the audible response while the shared communication channel is disabled.

18. The non-transitory computer-readable storage medium of claim 17, wherein disabling the shared communication channel further includes:
forgoing outputting, at the first electronic device, audio received at the second electronic device.

19. The non-transitory computer-readable storage medium of claim 17, wherein the one or more programs further comprise instructions, which when executed by the one or more processors, cause the first electronic device to:
after disabling the shared communication channel, activate the shared communication channel, including:
transmitting, over the shared communication channel, audio sampled by the microphone to the second electronic device.

20. The non-transitory computer-readable storage medium of claim 19, wherein activating the shared communication channel is performed in accordance with determining that a second audio input is not sampled within a predetermined duration after providing the audible response.

21. The non-transitory computer-readable storage medium of claim 19, wherein the one or more programs further comprise instructions, which when executed by the one or more processors, cause the first electronic device to:

cease to display the digital assistant indicator, wherein activating the shared communication channel is performed in accordance with ceasing to display the digital assistant indicator.

22. The non-transitory computer-readable storage medium of claim 1, wherein causing the first digital assistant to provide the audible response includes:
  causing the external electronic device to provide the audible response with one or more speakers of the external electronic device.

23. The non-transitory computer-readable storage medium of claim 1, wherein causing the first digital assistant to provide the audible response includes:
  receiving, from the external electronic device, the audible response; and
  outputting, using one or more speakers of the first electronic device, the audible response.

24. The non-transitory computer-readable storage medium of claim 1, wherein the one or more programs further comprise instructions, which when executed by the one or more processors, cause the first electronic device to:
  while displaying the XR environment, receive a notification;
  in accordance with receiving the notification, determine whether the first electronic device is engaged in the copresence session; and
  in accordance with a determination that the first electronic device is engaged in the copresence session, cause the external electronic device to provide an audio output representing the notification.

25. The non-transitory computer-readable storage medium of claim 1, wherein the one or more programs further comprise instructions, which when executed by the one or more processors, cause the first electronic device to:
  in accordance with a determination that the first audio input is intended for the first digital assistant operating on the external electronic device:
    receive, from the external electronic device, an indication that the first digital assistant is incapable of responding to a request included in the first audio input; and
    in accordance with receiving the indication:
      determine whether a second digital assistant operating on the first electronic device is capable of responding to the request; and
      in accordance with a determination that the second digital assistant is capable of responding to the request, output, using the second digital assistant, a second audible response to the request, wherein causing the first digital assistant to provide the audible response is performed in accordance with not receiving the indication.

26. The non-transitory computer-readable storage medium of claim 1, wherein determining whether the first audio input is intended for the first digital assistant is performed without identifying a second spoken trigger in the first audio input.

27. The non-transitory computer-readable storage medium of claim 1, wherein determining whether the first audio input is intended for the first digital assistant includes determining whether a direction of the first audio input corresponds to a physical location of the external electronic device.

28. The non-transitory computer-readable storage medium of claim 1, wherein determining whether the first audio input is intended for the first digital assistant includes analyzing a content of the first audio input.

29. A first electronic device, comprising:
  a display;
  a microphone;
  one or more processors;
  a memory; and
  one or more programs, wherein the one or more programs are stored in the memory and configured to be executed by the one or more processors, the one or more programs including instructions for:
    displaying, on the display, an extended reality (XR) environment corresponding to a copresence session that includes a first user associated with the first electronic device and a second user associated with a second electronic device, wherein the first user is different from the second user and the first electronic device is different from the second electronic device, and wherein the copresence session is configured such that the first user and the second user simultaneously experience a shared environment; and
    while displaying the XR environment corresponding to the copresence session:
      sampling, with the microphone, a first audio input;
      determining whether the first audio input is intended for a first digital assistant operating on an external electronic device; and
      in accordance with a determination that the first audio input is intended for the first digital assistant:
        causing the first digital assistant to provide an audible response to the first audio input, wherein the audible response is not transmitted to the second electronic device over a shared communication channel for the copresence session.

30. The first electronic device of claim 29, wherein the one or more programs further include instructions for:
  in accordance with a determination that the first audio input is not intended for the first digital assistant operating on the external electronic device:
    forgoing causing the first digital assistant to provide the audible response.

31. The first electronic device of claim 29, wherein the one or more programs further include instructions for:
  transmitting, over the shared communication channel, the first audio input to the second electronic device.

32. The first electronic device of claim 31, wherein transmitting the first audio input is performed in accordance with a determination that the first audio input is intended for the first digital assistant.

33. The first electronic device of claim 29, wherein the one or more programs further include instructions for:
  determining whether the first audio input corresponds to a personal domain, wherein causing the first digital assistant to provide the audible response that is not transmitted over the shared communication channel is performed in accordance with a determination that the first audio input corresponds to the personal domain.

34. The first electronic device of claim 29, wherein the one or more programs further include instructions for:
  displaying, in the XR environment, a physical representation of the external electronic device.

35. The first electronic device of claim 34, wherein displaying the XR environment includes:
  displaying a first view of the XR environment, the first view corresponding to a first pose associated with the first electronic device, wherein:

the first view includes an avatar associated with the second electronic device; and
the first view does not include the physical representation of the external electronic device.

36. The first electronic device of claim 35, wherein the one or more programs further include instructions for:
detecting a change from the first pose associated with the first electronic device to a second pose associated with the first electronic device, wherein the external electronic device is visible from the second pose but not from the first pose; and
in accordance with detecting the change:
replacing the display of the first view with a display of a second view of the XR environment, the second view corresponding to the second pose, wherein:
the second view includes the physical representation of the external electronic device displayed at a physical location of the external electronic device.

37. The first electronic device of claim 34, wherein the physical representation is displayed at a physical location of the external electronic device, and wherein determining whether the first audio input is intended for the first digital assistant operating on the external electronic device includes:
determining that a pose associated with the first electronic device corresponds to the physical location while sampling the first audio input.

38. The first electronic device of claim 37, wherein determining that the pose corresponds to the physical location while sampling the first audio input includes:
determining that a gaze is directed at the physical representation while sampling the first audio input.

39. The first electronic device of claim 37, wherein determining that the pose corresponds to the physical location while sampling the first audio input includes:
detecting, using one or more sensors of the first electronic device, the external electronic device.

40. The first electronic device of claim 34, wherein the one or more programs further include instructions for:
concurrently displaying, in the XR environment, a digital assistant indicator with the physical representation, wherein determining that the first audio input is intended for the first digital assistant includes determining that the first audio input is sampled while the digital assistant indicator is concurrently displayed with the physical representation.

41. The first electronic device of claim 40, wherein the one or more programs further include instructions for:
before sampling the first audio input, sampling a second audio input, and wherein concurrently displaying the digital assistant indicator with the physical representation includes:
concurrently displaying the digital assistant indicator with the physical representation in accordance with a determination that the second audio input includes a spoken trigger for the first digital assistant.

42. The first electronic device of claim 40, wherein the physical representation is displayed at a physical location of the external electronic device, and wherein concurrently displaying the digital assistant indicator with the physical representation includes:
concurrently displaying the digital assistant indicator with the physical representation in accordance with a determination that a pose associated with the first electronic device corresponds to the physical location.

43. The first electronic device of claim 40, wherein the one or more programs further include instructions for:

while concurrently displaying the digital assistant indicator with the physical representation, disabling the shared communication channel, including:
forgoing transmitting, over the shared communication channel, audio to the second electronic device, wherein the first digital assistant provides the audible response while the shared communication channel is disabled.

44. The first electronic device of claim 43, wherein disabling the shared communication channel further includes:
forgoing outputting, at the first electronic device, audio received at the second electronic device.

45. The first electronic device of claim 43, wherein the one or more programs further include instructions for:
after disabling the shared communication channel, activating the shared communication channel, including:
transmitting, over the shared communication channel, audio sampled by the microphone to the second electronic device.

46. The first electronic device of claim 45, wherein activating the shared communication channel is performed in accordance with determining that a second audio input is not sampled within a predetermined duration after providing the audible response.

47. The first electronic device of claim 45, wherein the one or more programs further include instructions for:
ceasing to display the digital assistant indicator, wherein activating the shared communication channel is performed in accordance with ceasing to display the digital assistant indicator.

48. The first electronic device of claim 29, wherein causing the first digital assistant to provide the audible response includes:
causing the external electronic device to provide the audible response with one or more speakers of the external electronic device.

49. The first electronic device of claim 29, wherein causing the first digital assistant to provide the audible response includes:
receiving, from the external electronic device, the audible response; and
outputting, using one or more speakers of the first electronic device, the audible response.

50. A method, comprising:
at a first electronic device having one or more processors, memory, a microphone, and a display:
displaying, on the display, an extended reality (XR) environment corresponding to a copresence session that includes a first user associated with the first electronic device and a second user associated with a second electronic device, wherein the first user is different from the second user and the first electronic device is different from the second electronic device, and wherein the copresence session is configured such that the first user and the second user simultaneously experience a shared environment; and
while displaying the XR environment corresponding to the copresence session:
sampling, with the microphone, a first audio input;
determining whether the first audio input is intended for a first digital assistant operating on an external electronic device; and
in accordance with a determination that the first audio input is intended for the first digital assistant:

causing the first digital assistant to provide an audible response to the first audio input, wherein the audible response is not transmitted to the second electronic device over a shared communication channel for the copresence session.

51. The method of claim 50, further comprising:
in accordance with a determination that the first audio input is not intended for the first digital assistant operating on the external electronic device:
forgoing causing the first digital assistant to provide the audible response.

52. The method of claim 50, further comprising:
transmitting, over the shared communication channel, the first audio input to the second electronic device.

53. The method of claim 52, wherein transmitting the first audio input is performed in accordance with a determination that the first audio input is intended for the first digital assistant.

54. The method of claim 50, further comprising:
determining whether the first audio input corresponds to a personal domain, wherein causing the first digital assistant to provide the audible response that is not transmitted over the shared communication channel is performed in accordance with a determination that the first audio input corresponds to the personal domain.

55. The method of claim 50, further comprising:
displaying, in the XR environment, a physical representation of the external electronic device.

56. The method of claim 55, wherein displaying the XR environment includes:
displaying a first view of the XR environment, the first view corresponding to a first pose associated with the first electronic device, wherein:
the first view includes an avatar associated with the second electronic device; and
the first view does not include the physical representation of the external electronic device.

57. The method of claim 56, further comprising:
detecting a change from the first pose associated with the first electronic device to a second pose associated with the first electronic device, wherein the external electronic device is visible from the second pose but not from the first pose; and
in accordance with detecting the change:
replacing the display of the first view with a display of a second view of the XR environment, the second view corresponding to the second pose, wherein:
the second view includes the physical representation of the external electronic device displayed at a physical location of the external electronic device.

58. The method of claim 55, wherein the physical representation is displayed at a physical location of the external electronic device, and wherein determining whether the first audio input is intended for the first digital assistant operating on the external electronic device includes:
determining that a pose associated with the first electronic device corresponds to the physical location while sampling the first audio input.

59. The method of claim 58, wherein determining that the pose corresponds to the physical location while sampling the first audio input includes:
determining that a gaze is directed at the physical representation while sampling the first audio input.

60. The method of claim 58, wherein determining that the pose corresponds to the physical location while sampling the first audio input includes:

detecting, using one or more sensors of the first electronic device, the external electronic device.

61. The method of claim 55, further comprising:
concurrently displaying, in the XR environment, a digital assistant indicator with the physical representation, wherein determining that the first audio input is intended for the first digital assistant includes determining that the first audio input is sampled while the digital assistant indicator is concurrently displayed with the physical representation.

62. The method of claim 61, further comprising:
before sampling the first audio input, sampling a second audio input, and wherein concurrently displaying the digital assistant indicator with the physical representation includes:
concurrently displaying the digital assistant indicator with the physical representation in accordance with a determination that the second audio input includes a spoken trigger for the first digital assistant.

63. The method of claim 61, wherein the physical representation is displayed at a physical location of the external electronic device, and wherein concurrently displaying the digital assistant indicator with the physical representation includes:
concurrently displaying the digital assistant indicator with the physical representation in accordance with a determination that a pose associated with the first electronic device corresponds to the physical location.

64. The method of claim 61, further comprising:
while concurrently displaying the digital assistant indicator with the physical representation, disabling the shared communication channel, including:
forgoing transmitting, over the shared communication channel, audio to the second electronic device, wherein the first digital assistant provides the audible response while the shared communication channel is disabled.

65. The method of claim 64, wherein disabling the shared communication channel further includes:
forgoing outputting, at the first electronic device, audio received at the second electronic device.

66. The method of claim 64, further comprising:
after disabling the shared communication channel, activating the shared communication channel, including:
transmitting, over the shared communication channel, audio sampled by the microphone to the second electronic device.

67. The method of claim 66, wherein activating the shared communication channel is performed in accordance with determining that a second audio input is not sampled within a predetermined duration after providing the audible response.

68. The method of claim 66, further comprising:
ceasing to display the digital assistant indicator, wherein activating the shared communication channel is performed in accordance with ceasing to display the digital assistant indicator.

69. The method of claim 50, wherein causing the first digital assistant to provide the audible response includes:
causing the external electronic device to provide the audible response with one or more speakers of the external electronic device.

70. The method of claim 50, wherein causing the first digital assistant to provide the audible response includes:
receiving, from the external electronic device, the audible response; and outputting, using one or more speakers of the first electronic device, the audible response.

\* \* \* \* \*

UNITED STATES PATENT AND TRADEMARK OFFICE
CERTIFICATE OF CORRECTION

| | | |
|---|---|---|
| PATENT NO. | : 12,271,658 B2 | Page 1 of 1 |
| APPLICATION NO. | : 18/278369 | |
| DATED | : April 8, 2025 | |
| INVENTOR(S) | : Jessica J. Peck et al. | |

It is certified that error appears in the above-identified patent and that said Letters Patent is hereby corrected as shown below:

On the Title Page

Item (71), in the Applicants:
Line 2, delete ";DATHOMIR LABORATORIES LLC, Boston, MA (US)"

Signed and Sealed this
Ninth Day of September, 2025

Coke Morgan Stewart
*Acting Director of the United States Patent and Trademark Office*